US012801749B2

(12) United States Patent
Fleming et al.

(10) Patent No.: US 12,801,749 B2
(45) Date of Patent: Nov. 17, 2026

(54) DETERMINING TREND RECORDS FOR VULNERABILITY DETECTION AND MANAGEMENT IN IT SYSTEMS

(71) Applicant: Nucleus Security, Inc., Sarasota, FL (US)

(72) Inventors: Nicolas Fleming, Leesburg, VA (US); Stephen Carter, Fleming Island, FL (US); Scott Kuffer, Fleming Island, FL (US)

(73) Assignee: Nucleus Security, Inc., Sarasota, FL (US)

( * ) Notice: Subject to any disclaimer, the term of this patent is extended or adjusted under 35 U.S.C. 154(b) by 617 days.

(21) Appl. No.: 17/937,369

(22) Filed: Sep. 30, 2022

(65) Prior Publication Data

US 2024/0111873 A1 Apr. 4, 2024

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC ..... G06F 21/577; G06F 21/57; H04L 63/1433
See application file for complete search history.

(56) References Cited

U.S. PATENT DOCUMENTS 7,325,252 B2 * 1/2008 Bunker, V .............. H04L 43/00 726/25
7,926,113 B1 * 4/2011 Gula ................... H04L 63/1425 726/25
8,141,155 B2 * 3/2012 Jeschke ............... H04L 63/1433 713/161
8,528,094 B1 * 9/2013 La Grenade .......... G06F 21/577 726/25
9,294,498 B1 * 3/2016 Yampolskiy ..... G06Q 10/06393
9,407,645 B2 * 8/2016 Modi .................... G06F 40/205
9,501,647 B2 * 11/2016 Yampolskiy ............ H04L 63/08
10,277,619 B1 * 4/2019 Clark .................. H04L 63/1433
11,057,418 B2 * 7/2021 Ocepek ............... H04L 63/1433
11,757,907 B1 * 9/2023 Berger ...................... G06N 7/01 726/23
2012/0185945 A1 * 7/2012 Andres ................. G06F 21/568 726/25
2018/0103054 A1 * 4/2018 Cran ....................... H04L 63/20
2023/0283521 A1 * 9/2023 Berger .................... H04L 63/20 709/223

* cited by examiner

*Primary Examiner* — Zachary A. Davis
(74) *Attorney, Agent, or Firm* — Scale LLP

(57) ABSTRACT

Disclosed are methods, systems and non-transitory computer readable memory for vulnerability detection and management. For instance, a method may include obtain asset information for an organization, wherein the asset information indicates a plurality of assets; obtain a set of grouping rules, wherein the set of grouping rules defines a plurality of groups based on asset attributes; obtain asset data from at least one source, wherein the asset data indicates particular attributes for at least a subset of assets of the plurality of assets; determine at least one specific group for each of the subset of assets; generate a data structure associating each asset of the subset of assets to a first group, thereby grouping the subset of assets into the first group; and perform at least one vulnerability management action using a command that applies to all of the assets, and only the assets, of the first group.

19 Claims, 19 Drawing Sheets

800

100

300

| host_id | scan_date | finding_number | finding_justification_key |
|---|---|---|---|
| asset1 | 2021-04-01 01:02:03 | vuln1 | vuln1-port80 |
| asset1 | 2021-04-01 01:02:03 | vuln2 | vuln2 |
| asset2 | 2021-04-01 01:02:03 | vuln2 | vuln2 |

| analytic_vulns_id | finding_number | host_id | finding_justification_key |
|---|---|---|---|
| 1 | vuln1 | asset1 | vuln1-port80 |
| 1 | vuln2 | asset1 | vuln2 |
| 1 | vuln2 | asset2 | vuln2 |

| trend_date | host-id | finding_number | finding_status |
|---|---|---|---|
| 2021-04-01 | asset1 | vuln1 | 1 (discovered) |
| 2021-04-01 | asset1 | vuln2 | 1 (discovered) |
| 2021-04-01 | asset2 | vuln2 | 1 (discovered) |

500A

502 scan_date : 2021-05-01 04:05:06
vulns :
    vuln :
        asset : asset1
        finding_name : vuln2
        finding_severity : Informational
    vuln:
        asset : asset2
        finding_name : vuln2
        finding_severity : Informational

404

| host_id | scan_date | finding_number | finding_justification_key |
|---|---|---|---|
| asset1 | 2021-04-01 01:02:03 | vuln1 | vuln1-port80 |
| asset1 | 2021-04-01 01:02:03 | vuln2 | vuln2 |
| asset2 | 2021-04-01 01:02:03 | vuln2 | vuln2 |
| asset1 | 2021-05-01 04:05:06 | vuln2 | vuln2 |
| asset2 | 2021-05-01 04:05:06 | vuln2 | vuln2 |

504

408

| analytic_vulns_id | finding_number | finding_severity | finding_count |
|---|---|---|---|
| 1 | vuln1 | Critical | 1 |
| 1 | vuln2 | Informational | 2 |
| 2 | vuln2 | Informational | 2 |

508

406

| analytic_vulns_id | analytic_date | analytic_source |
|---|---|---|
| 1 | 2021-04-01 01:02:03 | scan |
| 2 | 2021-05-01 04:05:06 | scan |

506

FIG. 5A

500B

404

| host_id | scan_date | finding_number | finding_justification_key |
|---|---|---|---|
| asset1 | 2021-04-01 01:02:03 | vuln1 | vuln1-port80 |
| asset1 | 2021-04-01 01:02:03 | vuln2 | vuln2 |
| asset2 | 2021-04-01 01:02:03 | vuln2 | vuln2 |
| asset1 | 2021-05-01 04:05:06 | vuln2 | vuln2 |
| asset2 | 2021-05-01 04:05:06 | vuln2 | vuln2 |

410

| analytic_vulns_id | finding_number | host_id | finding_justification_key |
|---|---|---|---|
| 1 | vuln1 | asset1 | vuln1-port80 |
| 1 | vuln2 | asset1 | vuln2 |
| 1 | vuln2 | asset2 | vuln2 |
| 2 | vuln2 | asset1 | vuln2 |
| 2 | vuln2 | asset2 | vuln2 |

510

412

| trend_date | host-id | finding_number | finding_status |
|---|---|---|---|
| 2021-04-01 | asset1 | vuln1 | 1 (discovered) |
| 2021-04-01 | asset1 | vuln2 | 1 (discovered) |
| 2021-04-01 | asset2 | vuln2 | 1 (discovered) |
| 2021-05-01 | asset1 | vuln1 | 4 (scan-mitigated) |
| 2021-05-01 | asset1 | vuln2 | 0 (active) |
| 2021-05-01 | asset2 | vuln2 | 0 (active) |

512

FIG. 5B

DETERMINING TREND RECORDS FOR VULNERABILITY DETECTION AND MANAGEMENT IN IT SYSTEMS

TECHNICAL FIELD

Various aspects of the present disclosure relate generally to systems and methods for vulnerability detection and management in information technology (IT) systems and, more particularly, to systems and methods for vulnerability detection and management in IT systems using asset grouping rules and/or determining trend records.

BACKGROUND

Generally, vulnerability detection and management in IT systems is difficult, as IT systems are not static (e.g., configurations, software, users, and the like change over time) and are exposed to evolving external actors (e.g., hackers, viruses, and the like). Moreover, IT systems have increased in size and complexity. Thus, timely, intelligent and efficient detection and management of vulnerabilities in IT systems is a challenge.

The present disclosure is directed to overcoming one or more of these above-referenced challenges.

SUMMARY OF THE DISCLOSURE

According to certain aspects of the disclosure, systems, methods, and computer readable memory are disclosed for vulnerability detection and management in IT systems.

For instance, a system for vulnerability detection and management may include: at least one processor; and at least one memory storing instructions. The system may be configured to: obtain asset information for an organization, wherein the asset information indicates a plurality of assets; obtain a set of grouping rules, wherein the set of grouping rules defines a plurality of groups based on asset attributes; obtain asset data from at least one source, wherein the asset data indicates particular attributes for at least a subset of assets of the plurality of assets; determine at least one specific group for each asset of the subset of assets; generate a data structure associating each asset of the subset of assets to a first group, thereby grouping the subset of assets into the first group; and perform at least one vulnerability management action using a command that applies to all of the assets, and only the assets, of the first group.

For instance, a computer-implemented method for vulnerability detection and management may include: obtaining asset information for an organization, wherein the asset information indicates a plurality of assets; obtaining a set of grouping rules, wherein the set of grouping rules defines a plurality of groups based on asset attributes; obtaining asset data from at least one source, wherein the asset data indicates particular attributes for at least a subset of assets of the plurality of assets; determining at least one specific group for each of the subset of assets based on the set of grouping rules and the particular attributes; generating a data structure associating each asset of the subset of assets to a first group, thereby grouping the subset of assets into the first group; and performing at least one vulnerability management action using a command that applies to all of the assets, and only the assets, of the first group.

For instance, a system for vulnerability detection and management may include: at least one processor; and at least one memory storing instructions. The system may be configured to: obtain scanner data from at least one scanner, wherein the scanner data includes a plurality of findings; extract data bits for each finding from the scanner data; determine, for each finding, a set of values based on the extracted data bits; store, for each finding, a finding record in a finding data structure, wherein a finding record includes a set of values for a finding; determine at least one analytic record for the plurality of findings; store the at least one analytic record in at least one analytic data structure; determine a plurality of trend records based on the finding data structure and the at least one analytic data structure, wherein the plurality of trend records include an indication of a change in a vulnerability status from a first time period to a second time period; and cause the indication of the change in the vulnerability status from the first time period to the second time period to be displayed to a user.

For instance, a computer-implemented method for vulnerability detection and management may include: obtaining scanner data from at least one scanner, wherein the scanner data includes a plurality of findings; extracting data bits for each finding from the scanner data; determining, for each finding, a set of values based on the extracted data bits; storing, for each finding, a finding record in a finding data structure, wherein a finding record includes a set of values for a finding; determining at least one analytic record for the plurality of findings; storing the at least one analytic record in at least one analytic data structure; determining a plurality of trend records based on the finding data structure and the at least one analytic data structure, wherein the plurality of trend records include an indication of a change in a vulnerability status from a first time period to a second time period; and causing the indication of the change in the vulnerability status from the first time period to the second time period to be displayed to a user. Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

FIGS. 4A-4B and 5A-5B depict a vulnerability management system determining and managing records for vulnerability detection and management in IT systems.

DETAILED DESCRIPTION

Various aspects of the present disclosure relate generally to vulnerability detection and management in IT systems using asset grouping rules and/or determining trend records. For instance, in some cases, scanners may detect thousands or millions of data points (e.g., vulnerabilities and the like) for thousands or millions of assets of IT systems of an organization. Systems of the present disclosure may manage, over time, very large numbers (e.g., millions, billions, or more) of records regarding the data points (e.g., vulnerabilities and the like) for the thousands or millions of assets of IT systems of organization(s). Thus, systems of the present disclosure may perform certain actions to be precise (e.g., avoid false positives and false negatives) while being computationally efficient (for both memory and processor time).

In some cases, the system of the present disclosure may use asset grouping rules to group assets into groups and perform vulnerability management actions on a group-basis. In this manner, a user (e.g., an IT security user) may be informed of vulnerabilities on a group basis (e.g., for differing severity levels) and act accordingly.

In some cases, the system of the present disclosure may determine trend records to track vulnerabilities as the vulnerabilities are discovered, active, and mitigated. In this manner, the system may efficiently process millions or billions of records to thereby inform users in a timely manner of vulnerabilities.

Thus, methods and systems of the present disclosure may be improvements to computer technology and/or vulnerability detection and management in IT systems.

Environment

Figure 1:
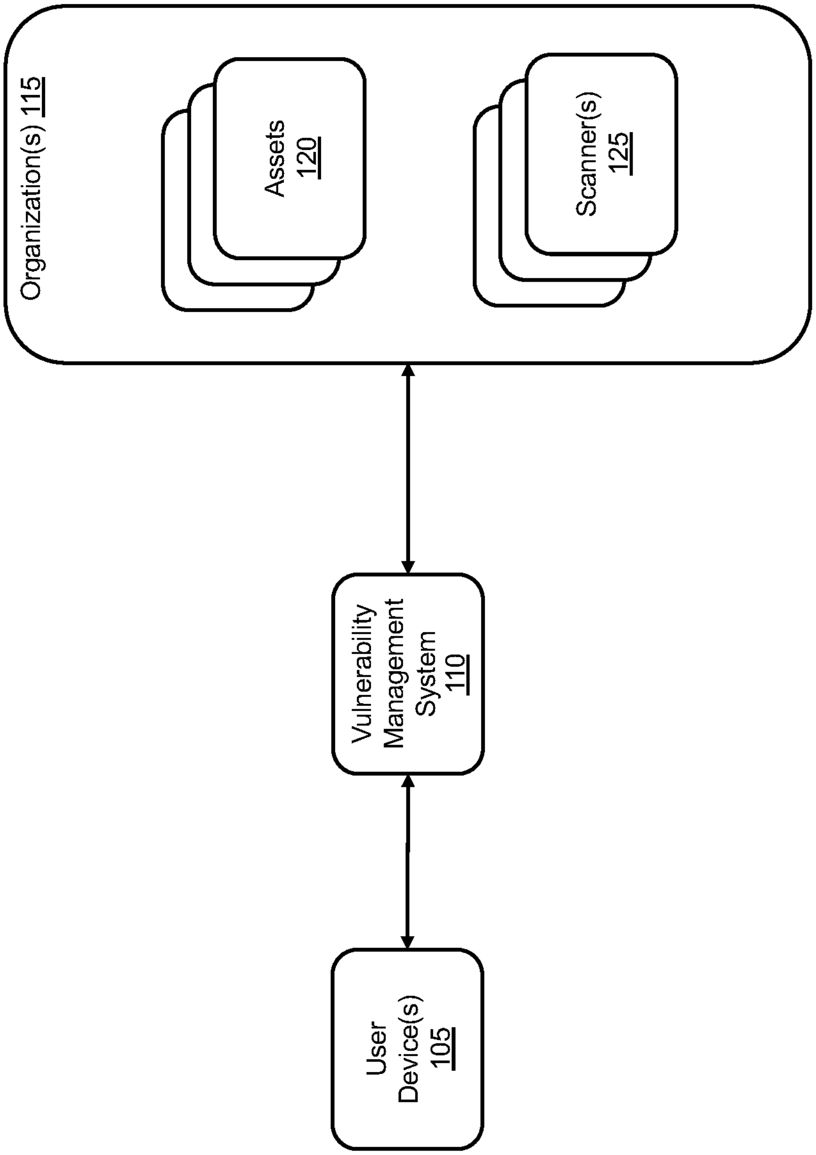
FIG. 1 depicts an example environment for vulnerability detection and management in IT systems.

FIG. 1 depicts an example environment 100 for vulnerability detection and management in IT systems. The environment 100 may include user device(s) 105, a vulnerability management system 110 and organization 115.

The user device(s) 105 (hereinafter referred to as "user device 105" for clarity of reference) may be various different types of devices, including computing devices (e.g., tablet, mobile phone, desktop computer, and the like), extended reality (XR) devices (e.g., augmented reality devices, virtual reality devices, mixed reality devices, and the like), and the like, that communicate using wired (e.g., ethernet, and the like) or wireless communication standards (e.g., WIFI, and the like). In some cases, the user device 105 may be a smartphone with an application to interface with the vulnerability management system 110. In some cases, the user device 105 may be a computing device operated by a user to interface with vulnerability management system 110 via a web interface or desktop application. In some cases, the user device 105 may be an XR device operated by a user to interact with the vulnerability management system 110 via XR applications, such as virtual reality devices, augmented reality devices, mixed reality devices, and the like. Generally, one or more such user devices 105 may connect to the vulnerability management system 110, via one or more wireless or wired communications systems, such as local networks, private networks, or the internet. In this manner, the user devices 105 may connect to and communicate with the vulnerability management system 110, as discussed herein.

The organization(s) 115 (hereinafter referred to as "organization 115" for clarity of reference) may be IT systems associated with entities (e.g., a business, government agency, other enterprise, or any subgroup or division thereof) and/or individuals. Each organization of the organization(s) 115 or individual may have an account with the vulnerability management system 110. The account may by managed by administrator(s) and/or IT security personal of the organization or the individual (collectively referred to as "users"). Each user of the organization may have a shared or separate account, with same or different access and authorizations to the account. The users may interact with the vulnerability management system 110 via the user devices 105.

An organization 115 may include a plurality of assets 120. The plurality of assets 120 may include, but is not limited to, network equipment (e.g., routers, modems, and the like) at locations associated with the organization 115, user devices 105 associated with the organization 115, office equipment (e.g., printers, scanners, and the like) associated with the organization 115, servers associated with the organization 115, software hosted any of the foregoing or hosted in cloud service providers, and the like.

An organization 115 may also include or be associated with at least one vulnerability scanner 125. In some cases, the organization 115 may host and execute a scanner 125 as an asset of the plurality of assets 120 to perform scanner functions. In some cases, the organization 115 may use a third party scanner 125 (e.g., that is managed by a third party) to perform scanner functions. The third party scanner 125 may be hosted and executed locally on behalf of the organization 115 and managed remotely by the third party. In some cases, the scanner 125 may be hosted and executed remotely (e.g., by the third party or in the cloud) and access relevant data to perform scanner functions. In some cases, the vulnerability management system 110 may host and/or manage the scanner 125 for the organization 115. In some cases, the vulnerability management system 110 may not host and/or manage the scanner 125 for the organization 115, but may instead receive scanner data from the scanner 125. In some cases, the organization 115 may have or be associated with only one scanner 125. In some cases, the organization 115 may have or be associated with two, three, or a plurality of scanners 125. For instance, different scanners 125 may focus on different aspects of the organization 115 (e.g., hardware versus software, and the like) or may be configured to detect different vulnerabilities or different categories of vulnerabilities.

A scanner 125 may obtain raw data about both vulnerabilities in the organization 115 and about the plurality of assets 120 of the organization 115 and output scanner data. The raw data, for each asset, may include one or combinations of: asset type (e.g., device (user device, server, printer, etc.), software (e.g., web server application, container, endpoint, and the like), asset name, asset ID (if embedded in asset metadata by the vulnerability management system 110), asset configuration, asset parameters, and/or device data (if hardware). An asset ID may uniquely identify an asset within the vulnerability management system 110, such that no two assets have a same asset ID. The scanner data may indicate vulnerabilities based on the raw data. The scanner data may be formatted according to output structure rules of the scanner 125. Generally, the scanner data may indicate at least a scan date (e.g., year, month, day, and time) and any vulnerabilities in vulnerability data. The vulnerability data may include asset ID data (e.g., an asset ID or data to ID an asset) and finding data (e.g., a common vulnerabilities and exposures (CVE) ID or ID particular to the scanner 125) to indicate the vulnerability. In some cases, the vulnerability data may also include vulnerability location data (e.g., port 80, software code, and the like) and/or severity data (e.g., critical, informational, and the like).

In some cases, a scanner 125 may also scan for assets separate from (or as a part of) scanning for vulnerabilities on assets. In some cases, a different asset scanner may scan for assets on a network associated with the organization 115.

Figure 2:
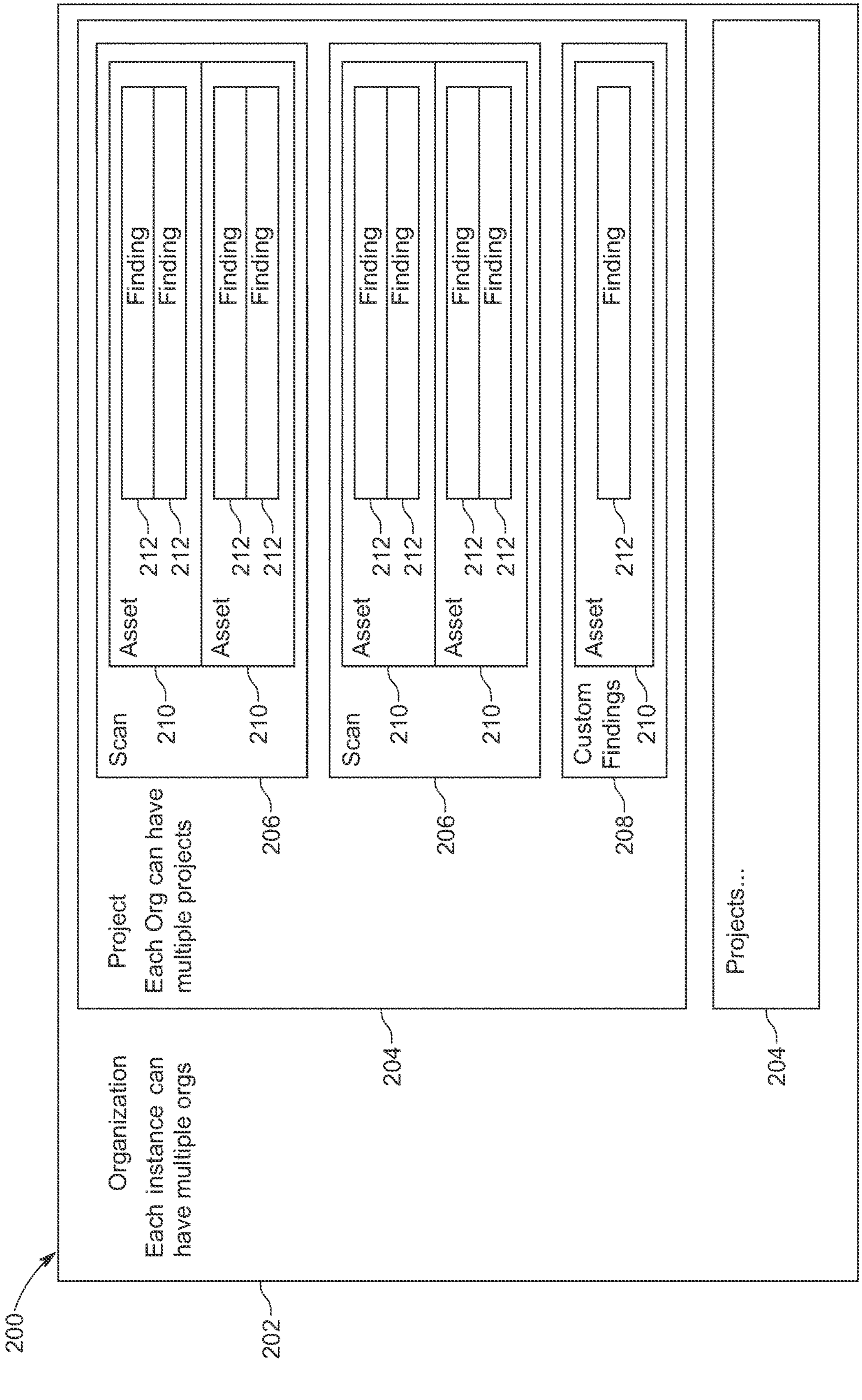
FIG. 2 depicts a block diagram depicting scan results.

Turning to FIG. 2, FIG. 2 depicts a block diagram depicting scan results 200. The scan results 200 may include scanner data schematically viewed from an instance of the vulnerability management system 110. Each instance (e.g., hosted on a server locally or in a cloud environment) of the vulnerability management system 110 may manage at least one organization 202. Each organization 202 may be associated with an account, as discussed herein with regards to an organization 115. Each organization 202 may include one or more projects 204. Each project 204 may have a project ID and may correspond to a set of assets (e.g., some of the plurality of assets 120 of IT systems associated with the organization 202). Each discrete output of scanner data (over time) from a scanner 125 (or scanners 125) may be a scan 206 for one or more assets 210. The scanner data may indicate findings 212 on the one or more assets 210. In some cases, a custom finding 208 may be obtained for a finding 212 on an asset 210. For instance, the custom finding 208 may be input by a user input on a user interface on the user device 105 or input, from a user device 105, via an API of the vulnerability management system 110.

Returning to FIG. 1, the vulnerability management system 110 may obtain data regarding the plurality of assets 120, group the assets into groups based on the data and/or user inputs, and perform vulnerability management actions for the assets in the groups. In some cases, the vulnerability management system 110 may obtain scanner data regarding the assets, determine a plurality of trend records that include an indication of a change in a vulnerability status from a first time period to a second time period, and perform vulnerability management actions for the assets, such as inform (e.g., display, transmit, alert, and the like) a user of the change in a vulnerability status.

A. Grouping Assets

In some cases, the vulnerability management system 110 may group assets based on asset attributes and/or user inputs (e.g., manually assigning them to groups). For instance, the vulnerability management system 110 may obtain asset information for an organization 115. The asset information may indicate some or all of the plurality of assets 120. The vulnerability management system 110 may obtain the asset information from a user input (e.g., via a user interface), via an input from a user device to an application programming interface (API) of the vulnerability management system 110, and/or from an API of an asset scanner (e.g., one of the scanners 125). For instance, to obtain the asset information for the organization, the vulnerability management system 110 may use a scanning tool (e.g., an asset scanner) to generate finding information (e.g., a list of assets with asset IDs or data to ID assets). The vulnerability management system 110 may extract the asset information from the finding information.

In some cases, the vulnerability management system 110 may obtain a set of grouping rules. The set of grouping rules may define a plurality of groups based on asset attributes. To obtain the set of grouping rules, the vulnerability management system 110 may: (1) receive user interactions with a web user interface to generate conditions to define the set of grouping rules (see, e.g., FIGS. 6A-6F), (2) receive a user upload of a file including a syntax-correct data structure that indicates conditions to define the set of grouping rules, and/or (3) receive data at an API of vulnerability management system 110 to provide conditions to define the set of grouping rules. Each grouping rule may include one or more conditions, thus the grouping rule may be arbitrarily complex logical operators on values of asset attributes, to thereby determine which assets belong to a defined group. The vulnerability management system 110 may enable users to generate the grouping rules, so that assets may be managed as a group. The attributes of assets may include asset name, asset IP address, asset group, asset OS, business owner, business owner team, support team, source, connector, and the like.

In some cases, the vulnerability management system 110 may obtain asset data from at least one source. For instance, the plurality of assets 120 indicated by the asset information may be a first collection of asset data, and the system 110 may periodically (or in response to a user request), re-obtain asset data to ensure the plurality of assets 120 is current (e.g., new assets are added, old assets are removed, etc.). The asset data may indicate particular attributes for at least a subset of assets of the plurality of assets. To obtain the asset data from the at least one source, the vulnerability management system 110 may (1) obtain data for specific assets by user interactions with a web user interface and/or file upload, or (2) obtain data from one or more APIs. The one or more APIs may be APIs of data connectors including: asset management tools, scanners (e.g., a scanner 125), ticketing tools, communication tools, cloud-tools, and the like. The asset data may include asset metadata, including attributes of an asset, such as asset name, asset IP address, asset group, asset OS, business owner, business owner team, support team, source, connector, and the like.

In some cases, the vulnerability management system 110 may determine at least one specific group for each of the subset of assets. In some cases, the vulnerability management system 110 may determine at least one specific group for each of the subset of assets based on the set of grouping rules and the particular attributes. In some cases, the vulnerability management system 110 may determine at least one specific group for each of the subset of assets based on user inputs manually selecting a group for an asset. In some embodiments, one or more of the assets may be categorized as belonging to a plurality of groups.

Generally, the vulnerability management system 110 may determine at least one group for each asset of the plurality of assets 120, thereby populating the plurality of groups (e.g., some or all of the groups) with assets. In some cases, a group may not have an asset. In some cases, all groups may have at least one asset.

In some cases, the plurality of groups includes at least one or more layers of a hierarchy of groups. For instance, a first group may have at least one child group, and a first child group of the first group may have at least one second child group, and so on. As an example, a first group may be Windows operating systems, a child group of Windows operating machines may be servers, a child group of servers (of Windows operating machines) may be Windows server 2022, and so on. The one or more layers of the hierarchy of groups may include at least a first layer of groups and a second layer of groups. In some cases, a subset of groups in the second layer of groups are nested under a group in the first layer of groups. The subset groups in the second layer of groups nested under the group in the first layer may share a same attribute as the group in the first layer. For instance, Windows server 2022 may share a server attribute with Windows server 2021, and Windows server 2022 may share an operating system attribute with Windows 11 personal computing devices. The one or more layers may include up to a predetermined number of layers. For instance, to reduce recursive looping, the predetermined number of layers may be limited to, e.g., 5, 10, or 20, or the like.

In some cases, to determine a group for an asset, the vulnerability management system 110 may: (1) determine attributes for the asset; (2) determine a grouping rule for the group is satisfied by the attributes for the asset; and (3) associate the asset with the group. For instance, the vulnerability management system 110 may determine the attributes for the asset by extracting the attributes from the asset data. The vulnerability management system 110 may determine whether any grouping rule of the set of grouping rules is satisfied (e.g., by applying the conditions of each grouping rule to values of the attributes).

In some cases, the vulnerability management system 110 may, if the group associated with the asset is a nested group, associate the asset with each parent group in each higher order layer. For instance, if the asset is a Windows Server 2022, the vulnerability management system 110 may associate the asset to the Windows Server 2022 group (a nested group of Windows Servers), associate the asset with the Windows Servers groups (a nested group of Windows operating systems), and associate the asset with the Windows operating system group. Thus, an asset may be associated to multiple groups. In some cases, each asset may be associated to only one lowest level group. In some cases, an asset may be associated to (only) lowest level groups (one or multiple).

In some cases, the vulnerability management system 110 may generate an asset data structure associating asset IDs and asset metadata (which may be used to ID assets), and generate an asset-group data structure associating each asset of the subset of assets to a first group, thereby grouping the subset of assets into the first group. Similarly, the vulnerability management system 110 may associate each asset with at least one group in the data structure. For instance, the data structure may be an asset-group table. The asset-group table may indicate asset(s) associated with certain groups, via asset IDs and group IDs. Group IDs may uniquely identify groups within the vulnerability management system 110.

In some cases, the vulnerability management system 110 may perform at least one vulnerability management action using a command that applies to all of the assets, and only the assets, of the first group. In some cases, the vulnerability management system 110 may perform a vulnerability management action that applies to a higher level group (if the asset is in a nested group). Generally, the vulnerability management system 110 may have a plurality vulnerability management actions that are triggered for different assets and/or groups in accordance with trigger conditions (e.g., asset has vulnerability detected). Some vulnerability management actions may be triggered for specific groups and/or specific assets (e.g., transmit a message to an endpoint associated with that specific group and/or specific asset), while some vulnerability management actions may apply to all assets and/or groups (e.g., displaying data associated therewith).

In some cases, the vulnerability management system 110 may detect vulnerability(s) for assets of the subset of assets and/or groups of the plurality of groups; and perform one or combinations of: display the vulnerability(s) for the assets based on the groups, or display summaries of the vulnerability(s) of the assets on a group-basis. For instance, the vulnerability management system 110 may summarize vulnerability(s) for assets on a group basis, on an asset basis, on an organizational basis, and the like. In this manner, vulnerability(s) for assets may be communicated to users of the vulnerability management system 110.

In some cases, to perform the at least one vulnerability management action using the command that applies to all of the assets, and only the assets, of the first group, the vulnerability management system 110 may: detect a vulnerability (e.g., based on new scanner data/trend records) for an asset of the first group, and perform one or combinations of: (1) transmit an alert to a defined endpoint for the asset and/or first group, (2) flag the first group on login, (3) generate external ticket(s) and assign based on the first group, (4) generate report(s) based on the first group, and/or (5) trigger one or more automation rules based on the first group. To transmit an alert to a defined endpoint, the vulnerability management system 110 may transmit a message to a user device associated with the asset and/or first group. To flag the first group on login, the vulnerability management system 110 may detect a user associated with the asset and/or first group has logged into the system, and display an alert symbol. To generate external ticket(s) and assign based on the first group, the vulnerability management system 110 may retrieve a ticket rule that defines ticket generation (e.g., form and content) and which user to receive the ticket, and generate the ticket in accordance with the ticket rule. To generate report(s) based on the first group, the vulnerability management system 110 may retrieve a report rule that defines a report generation (e.g., form and content) and populate the report in accordance with the report rule. To trigger one or more automation rules based on the first group, the vulnerability management system 110 may retrieve automation trigger rules; determine whether any automation trigger rules are satisfied; if any automation trigger rules are satisfied, trigger corresponding automation trigger rules. Automation trigger rules may disable the asset, monitor the asset, and the like. In this manner, assets in groups may have defined actions performed in accordance with their group membership and vulnerability detection and management may be more efficiently managed on a group basis instead of only an asset basis.

In some cases, the vulnerability management system 110 may group assets for a particular service and perform vulnerability actions for the service. For instance, the vulnerability management system 110 may obtain service data indicating tags ("service tags") for assets to associate the assets with a particular service. For instance, the vulnerability management system 110 may receive user inputs tagging certain assets, or a project may correspond to a service (e.g., payments, account services, and the like) and the vulnerability management system 110 may automatically tag assets of the project with the service tag. In some cases, the assets associated with the particular service may include a full stack for the particular service. The full stack may include device(s), OS(s), and/or web application(s) to provide the service. The vulnerability management system 110 may then form a service group based on the tags and a service grouping rule. Subsequently, the vulnerability management system 110 may detect a vulnerability for an asset of the service group; and perform one or combinations of: (1) transmit an alert for the service group, (2) flag the service group on login, (3) generate external ticket(s) and assign based on the service group, (4) generate report(s) based on the service group, and/or (5) trigger one or more automation rules based on the service group. In this manner, assets in service groups may have defined actions performed in accordance with their group membership in service groups and vulnerability detection and management may be more efficiently managed on a service group basis instead of only an asset basis. Moreover, services which are of high importance for business, safety, and the like may be monitored and detected on a service basis, in contrast to an IT system-wide basis.

In some cases, the vulnerability management system 110 may group assets for portions of the organizational hierarchy and perform vulnerability actions for the portions of the organizational hierarchy. For instance, the vulnerability management system 110 may obtain an organizational hierarchy; and map assets onto portions of the organizational hierarchy and associate the assets with the portions of the organizational hierarchy (e.g., groups for the portions of the organizational hierarchy). For instance, the vulnerability management system 110 may determine whether assets have a certain attribute (e.g., user role of user of asset) and associate the asset with a group that corresponds to the portion of the organizational hierarchy that corresponds to the certain attribute. The certain attribute may be a HR classification (e.g., employee title, employee division, employee role, employee location), or the certain attribute may be a flag to define a group (e.g., development, operations, sales, and the like). As an example, an asset may have a development attribute (e.g., in metadata of the asset), and the vulnerability management system 110 may associate the asset with a development portion (e.g., a development group) of the organizational hierarchy. The vulnerability management system 110 may then detect a vulnerability for an asset of a portion of organizational hierarchy; and perform one or combinations of: (1) transmit an alert for the portion of organizational hierarchy, (2) flag the portion of organizational hierarchy on login, (3) generate external ticket(s) and assign based on the portion of organizational hierarchy, (4) generate report(s) based on the portion of organizational hierarchy, and/or (5) trigger one or more automation rules based on the portion of organizational hierarchy. In this manner, assets in a group for a portion of the organizational hierarchy may have defined actions performed in accordance with their group membership in an organizational hierarchy group and vulnerability detection and management may be more efficiently managed on an organizational hierarchy basis instead of only an asset basis. Moreover, groups in the organizational hierarchy which are of high importance for business, safety, and the like may be monitored and detected on an organizational hierarchy basis, in contrast to an IT system-wide basis.

In some cases, the vulnerability management system 110 may obtain new asset data from the at least one source (e.g., in a same manner as discussed herein), and (2) update the data structure to add assets to, remove assets from, or move assets between groups of the plurality of groups based on the new asset data (e.g., attributes of assets have changed). In this manner, relationships between assets and groups may be kept updated and vulnerability management may be efficiently allocated.

B. Trend Records

In some cases, the vulnerability management system 110 may obtain scanner data regarding the assets, determine a plurality of trend records that include an indication of a change in a vulnerability status from a first time period to a second time period, and perform vulnerability management actions for the assets.

In some cases, the vulnerability management system 110 may obtain the scanner data from at least one scanner 125. The scanner data may include a plurality of findings regarding one or more assets of the plurality of assets 120. For instance, vulnerability management system 110 may request the scanner data or periodically receive the scanner data (e.g., each day, each hour, etc.) from the scanner 125. The scanner data may be a data structure (e.g., text file, JSON, and the like) generated in accordance with software of the scanner 125.

In some cases, the vulnerability management system 110 may extract data bits for each finding from the scanner data. To extract the data bits for each finding from the scanner data, the vulnerability management system 110 may: determine a type of scanner; determine a scanner model based on the type of scanner; and extract, for each finding, the data bits for the finding using the scanner model. For instance, the vulnerability management system 110 may determine the type of scanner based on metadata of the scanner data, the format of the scanner data, an IP address of the data packet transmitting the scanner data, and the like. Scanner models may be parsers designed to extract all or relevant parts from the scanner data, based on previous scanner data from the scanners 125. The data bits may include the scan date and vulnerability data, as discussed herein (e.g., asset ID (or information to ID an asset, such as asset metadata), vulnerability information (e.g., finding data such as CVE or other information to ID a vulnerability) and the like).

In some cases, the vulnerability management system 110 may determine, for each finding, a set of values based on the extracted data bits. The set of values may include at least an asset ID (of the vulnerability management system 110), and a vulnerability ID. In some cases, the set of values also includes a scan date and a key value. A key value may uniquely identify a vulnerability on a particular asset, such that a same vulnerability on a first aspect (e.g., port or portion of code, and the like) can be differentiated from a same vulnerability on a second aspect (e.g., port or portion of code, and the like) of a same asset. The vulnerability management system 110 may use the asset ID and the key value to differentiate a same vulnerability across different assets and within a single asset.

In some cases, to determine, for each finding, the set of values, the vulnerability management system 110 may normalize the data bits for a finding into a defined format; determine an asset ID for an asset for the finding; determine a vulnerability ID for the finding; and set at least the asset ID and the vulnerability ID as the set of values. To normalize the data bits for a finding into a defined format, the vulnerability management system 110 may convert scan dates into a certain format (e.g., year-month-day-time). Generally, determining the asset ID and vulnerability ID may also be considered "normalizing" actions as the asset ID and vulnerability ID may be converted into formats/data structures defined by vulnerability management system 110.

In some cases, to determine the asset ID, the vulnerability management system 110 may: obtain asset metadata from the data bits for the finding; determine whether the asset metadata corresponds to an existing asset; in response to determining the asset metadata corresponds to the existing asset, retrieve the asset ID for the existing asset; and, in response to determining the asset metadata does not correspond to the existing asset, generate a new asset record and obtain a new asset ID as the asset ID. The asset metadata may include attributes of an asset, such as asset name, asset IP address, asset group, asset OS, business owner, business owner team, support team, source, connector, and the like. To determine whether the asset metadata corresponds to an existing asset, the vulnerability management system 110 may search the asset data structure and/or the asset-group data structure for an asset that has a same set of asset attributes (or near similar, as certain attributes may be mutable over time). If a match (or near match) is found, the vulnerability management system 110 may retrieve an asset ID for the matching (or near match) asset. If no match (or near match) is found, the vulnerability management system 110 may add the asset to the asset data structure and/or add asset to the asset-group data structure (e.g., by determining whether the asset belongs to a group in accordance with grouping rules).

In some cases, to determine the vulnerability ID for the finding, the vulnerability management system 110 may: obtain finding data from the data bits for the finding; and determine the vulnerability ID based on the type of scanner and the finding data. For instance, in some cases, the scanner 125 may indicate a CVE ID as a part of the finding data, while in other cases, the scanner 125 may indicate a proprietary ID for a vulnerability. Thus, to determine the vulnerability ID based on the type of scanner and the finding data, the vulnerability management system 110 may: determine whether the finding data is a CVE based on the type of scanner; and in response to determining the finding data is the CVE based on the type of scanner, set the vulnerability ID as the CVE from the finding data. In the case that the finding data does not include the CVE based on the type of scanner, the vulnerability management system 110 may use a lookup function based on the type of scanner and the finding data to retrieve the vulnerability ID. The lookup function may be defined for each scanner 125 that does not include CVE in the finding data. The lookup function may define a CVE to each proprietary code used by scanners 125 that do not use CVE. In the case that the lookup function fails to return a match (e.g., for that scanner type or finding data), the vulnerability management system 110 may treat the finding in accordance with any indicated severity data associated therewith (e.g., critical, and the like). In some cases, the scanner 125 may provide the severity data in a first format or classification, and the vulnerability management system 110 may convert or map the severity data into a normalized manner. In this manner, the scanner data may be processed into a defined format for use by the vulnerability management system 110. In some cases, the scanner data is stored (e.g., for a set period of time), so that the vulnerability management system 110 may retrieve the scanner data to examine/analyze it for changes over time. In this manner, the vulnerability management system 110 may map different vulnerability classifications to a single vulnerability classification system used by the vulnerability management system 110.

In some cases, the vulnerability management system 110 may store, for each finding, a finding record in a finding data structure. A finding record may include the set of values for a finding. For instance, the finding data structure may be a finding table. The finding record may include at least an asset ID (of the vulnerability management system 110), and a vulnerability ID. In some cases, the finding record may also include a scan date and a key value. The vulnerability management system 110 may, periodically, based on a user input via a user device, or in response to a clean-up trigger or pendency timer, remove (e.g., stale) finding records from the finding data structure. For instance, the vulnerability management system 110 may remove (e.g., delete or move from the finding data structure to an inactive asset finding data structure) finding records that are more than a threshold period old, or remove finding records for assets (based on asset ID) that are no longer active (e.g., for a threshold period of time). In this manner, finding data for vulnerabilities may be stored for analysis and tracking and the vulnerability management system 110 may avoid additional computational resources to re-process raw scanner data.

In some cases, the vulnerability management system 110 may determine a key value for each of a plurality of findings of a scan event (e.g., for each finding in scanner data). The key value may differentiate a vulnerability of a finding from other vulnerabilities on a same asset (e.g., even if the vulnerabilities have a same vulnerability ID).

In some cases, the key value may be based on at least a vulnerability ID for a finding and at least one additional data bit of the finding. In some cases, the at least one additional data bit includes one or combinations of: a parameter of a web application, a port of a host, a portion of code, and/or a container build version. In some cases (e.g., for certain vulnerability types that are specific to an aspect of the asset), the key value may be a join of the vulnerability ID and a data bit (e.g., port number), so as to ensure differentiation between vulnerabilities of a same type on a same asset on a different aspect of the asset (e.g., a different port). In some cases (e.g., for certain vulnerability types that are not specific to an aspect of the asset), the key value may be a hash the vulnerability ID and the at least one additional data bit (e.g., portion of code) to obtain a hash value. In this manner, the key value for a first vulnerability may be differentiated from a key value of a same vulnerability on a same asset that is found in a different aspect (e.g., different portion of code) of the asset.

In some cases, the vulnerability management system 110 may determine at least one analytic record for the plurality of findings. For instance, the vulnerability management system 110 may generate a scan key value to differentiate a scan event occurring for the scanner data and generate scan metrics. The scan key value may uniquely identify a scan event corresponding to the scanner data being processed. The scan metrics may aggregate counts of finding types or other metrics for the scanner data. For instance, the scan metrics may include a count of different severity types based on the severity data of the scanner data. The vulnerability management system 110 may then perform one or combinations of: (1) in a first type of analytic record, associate the scan key value with at least a scan date in a first analytic data structure; (2) in a second type of analytic record, associate the scan key value and the scan metrics in a second analytic data structure; and/or (3) in a third type of analytic record, associate the scan key value, asset IDs, and vulnerability IDs in a third analytic data structure.

In some cases, the first type of analytic record may associate the scan key value with the scan date and, optionally, a source (e.g., scanner ID of scanner 125). In some cases, the first type of analytic record may associate the scan key value with the scan date, so to associate the scan key value with analytic record for all finding data across all data sources (e.g., asset scanners) and/or scanner 125 up to the scan date of the scanner data. The first analytic data structure may be a first analytic table. The first analytic data structure may track and associate scans (e.g., source and date) with scan key values. In this manner, the vulnerability management system 110 may use the scan key values to differentiate analytic records over time.

In some cases, the second type of analytic record may associate the scan metrics to the scan key value. In some case cases, the scan metrics may be for a corresponding scanner data or for all finding data across all data sources (e.g., asset scanners) and/or scanner 125 up to the scan date of the scanner data. The second type of analytic record may also include in the association a severity level (critical, high, medium, low, information, and the like) and/or a vulnerability ID. The second analytic data structure may be a second analytic table. The second analytic data structure may track and associate scan metrics (e.g., counts, vulnerability IDs, severity levels) with scan key values. In this manner, the vulnerability management system 110 may use the scan key values to differentiate and track scan metrics over time.

In some cases, the third type of analytic record may associate the scan key value, asset IDs, and vulnerability IDs of a scanner event (e.g., from a same scanner data). The third type of analytic record may also associate key values for the vulnerabilities of the scan event. The third analytic data structure may be a third analytic table. The third analytic data structure may track and associate findings (e.g., asset ID, vulnerability ID, and/or key value) with scan key values. In this manner, the vulnerability management system 110 may use the scan key values to differentiate and track findings over time.

In some cases, the vulnerability management system 110 may store the at least one analytic record in at least one analytic data structure. For instance, the vulnerability management system 110 may store the first type of analytic records in the first analytic data structure, store the second type of analytic records in the second analytic data structure, and store the third type of analytic records in the third analytic data structure. The vulnerability management system 110 may, periodically, based on a user input via a user device, or in response to a clean-up trigger or pendency timer, remove (e.g., stale) analytic records from the analytic data structures. For instance, the vulnerability management system 110 may remove (e.g., delete or move from an analytic data structure to an inactive analytic data structure) analytic records that are more than a threshold period old, or remove analytic records for assets (based on asset ID) that are no longer active (e.g., for a threshold period of time). In this manner, analytic records for vulnerabilities may be stored for analysis, tracking, and reporting and (after removal) the vulnerability management system 110 may avoid additional computational resources to process increasingly large datasets of records.

In some cases, the vulnerability management system 110 may determine a plurality of trend records based on the finding data structure and/or the at least one analytic data structure. The plurality of trend records may include an indication of a change in a vulnerability status from a first time period to a second time period. The plurality of trend records may include a trend date (corresponding to one or more scan key values, which correspond to one or more scanner data sets from scanner(s) 125 scanning the organization 115 on that date), asset ID, vulnerability ID, and, optionally, a key value for a finding. The finding of a trend record may be a finding in the scanner data or a finding that was previously discovered but not in the scanner data for the trend date.

In some cases, the vulnerability management system 110 may store the plurality of trend records in a trend data structure. For instance, the trend data structure may be a trend table. The trend data structure may associate trend statuses with asset IDs, vulnerability IDs, and a trend date (and optionally a key value for the finding). In this manner, the vulnerability management system 110 may track changes over time for vulnerabilities and indicate a trend status for a vulnerability.

For instance, the vulnerability management system 110 may use trend statuses to indicate the change in a vulnerability status from a first time period to a second time period. Examples of trend statuses to indicate the change in a vulnerability status are presented in Table 1.

TABLE 1

| Trend Status | | |
|---|---|---|
| Status | Means | Explanation |
| 0 | Active | This finding was found in the past and is still present |
| 1 | Discovered | When a finding is found for the first time |
| 2 | Discovered and mitigated | When a finding is found for the first time and is also mitigated on the same day |
| 3 | Manually mitigated first time | The first time a finding is manually mitigated it is set to this status. The system may use this trend date as the “mitigated date” for the finding |
| 4 | Scan mitigated | This finding was in a previous analytic but not in the latest scan, which means it was mitigated via scan results |
| 5 | Manually mitigated still | A manually mitigated finding still shows up in the scanner data since it still exists. This status indicates to the system that it is still manually mitigated, and may not be used for mitigation calculations |

In some cases, to determine the plurality of trend records based on the finding data structure and/or the at least one analytic data structure, the vulnerability management system 110 may: compare different scan events (e.g., different scanner data sets with different scan key values) by comparing analytic records associated with different scan key values to determine the change in a vulnerability status from a first time period to a second time period.

In some cases, to determine a trend status as discovered or active, the vulnerability management system 110 may determine whether an analytic record of a newest scan key value matches an analytic record of a previous scan key value. In the case that the analytic record of the newest scan key value does not match any analytic record of the previous scan key value, the vulnerability management system 110 may generate a trend record and determine a trend status for the trend record as discovered. In the case that the analytic record of the newest scan key value does match an analytic record of the previous scan key value, the vulnerability management system 110 may generate a trend record and determine a trend status for the trend record as active.

The vulnerability management system 110 may associate the trend record with the scan date (or scan key value). To determine whether an analytic record of a newest scan key value matches an analytic record of a previous scan key value, the vulnerability management system 110 may select a third type of analytic record from the third analytic data structure that is associated with the newest scan key value, and determine whether any of the third type of analytic records associated with other scan key values have a same asset ID, vulnerability ID, and key value. In some cases, the vulnerability management system 110 may select each new third type of analytic record iteratively or in parallel, to determine whether prior records (for asset ID, vulnerability ID, and key value) already exist in the third data structure. In some cases, the vulnerability management system 110 may use database search syntax, such as SQL syntax search, to efficiently search the thousands to billions of records. For instance, the vulnerability management system 110 may use join, union, select, where, and the like. In this manner, new vulnerabilities (e.g., not previously detected before) may be efficiently detected, and vulnerabilities that are still active (e.g., detected before, and are detected again) may be efficiently detected.

For instance, to determine a trend status as scan mitigated, the vulnerability management system 110 may determine whether an analytic record of a newest scan key value matches an analytic record of a previous scan key value. In the case that the analytic record of any previous scan key value does not match any analytic record of the newest scan key value, the vulnerability management system 110 may generate a trend record and determine a trend status for the trend record as scan mitigated. In this manner, vulnerabilities that have been mitigated may be updated and efficiently detected, as the vulnerability may have been fixed and the vulnerability management system 110 may detect that it is not present anymore.

In some cases, to determine a trend status as manually mitigated, the vulnerability management system 110 may obtain a justification data structure that includes justification records. The justification records may include an association of asset ID, vulnerability ID, key value, and mitigation data. The mitigation data may indicate a user input acknowledging (and ignoring) the vulnerability or a user input acknowledging and indicating the vulnerability has been fixed, and the like. The vulnerability management system 110 may determine whether any finding record in the finding data structure associated with a new scanner data or any analytic record (e.g., a third type of analytic record) matches a record in the justification data structure. In the case of a match, the vulnerability management system 110 may generate a trend record and determine a trend status for the trend record as manually mitigated. The vulnerability management system 110 may (or may not) continue processing finding data for the key value associated with the manually mitigated trend record (thereby avoiding additional processing of analytics). In some cases, a scanner 125 may indicate that a finding has been manually mitigated, and the vulnerability management system 110 may map the scanner status to a trend status and/or the justification data structure. In this manner, manually mitigated vulnerabilities may be tracked and reported, even if a scanner 125 still reports a finding indicating the vulnerability.

In some cases, to determine a trend status as still manually mitigated, the vulnerability management system 110 may proceed as in the manually mitigated case but also determine whether a prior trend record in the trend data structure matches the trend record generated for the current scanner data. In the case the (new) trend record matches the prior trend record (e.g., same trend status, asset ID, vulnerability ID, and/or key value, but not trend date), the vulnerability management system 110 may update the trend status (of the new trend record) to still manually mitigated.

In some cases, to determine a trend status as discovered and mitigated, the vulnerability management system 110 may determine whether an analytic record of a newest scan key value matches an analytic record of a previous scan key value. In the case that the analytic record of the newest scan key value does not match any analytic record of a previous scan key value and the scanner data indicates the vulnerability has been mitigated, the vulnerability management system 110 may generate a trend record and determine a trend status for the trend record as discovered and mitigated In some cases, certain scanners 125 may detect and cause a vulnerability to be mitigated, and indicate the same in the scanner data. In some cases, certain scanners 125 may scan the organization 115 multiple times before outputting a scanner data set, such that the scanner 125 may discover a vulnerability; (later before outputting the scanner data) not detect the vulnerability; and determine the vulnerability has been mitigated. In this manner, vulnerabilities may be tracked and reported, even if mitigated.

In some cases, a first scanner 125 may report (e.g., at a first time) a finding for the vulnerability, and a second scanner 125 may report (e.g., at second time later than the first time) that the vulnerability is not present (e.g., by absence of the vulnerability in the findings). In this case, if the scanners 125 report the vulnerability (in a first scanner data) and absence (e.g., by not including it in a second scanner data), the vulnerability management system 110 may determine the trend status as discovered and mitigated (e.g., if the first time and second time are within a threshold period of time, such as a same date) or determine the trend status as discovered (on the first time on a first date, as indicated by the first scanner 125), active (if applicable, on an intermediate date between the first date and a second date for the second time), and scan mitigated (on the second date, as indicated by the second scanner 125). In this manner, the vulnerability management system 110 may reduce false positives (e.g., by reporting of a vulnerability that has already been mitigated).

In some cases, a first scanner 125 may not cause a status of a vulnerability detected by a second scanner 125 to be mitigated. In this case, the trend status of the vulnerability indicated by the first scanner 125 may only be changed to scan mitigated by the first scanner 125 or by a manual mitigation indication. In this manner, the vulnerability management system 110 may reduce false negatives, by reporting on a potential vulnerability, so that the potential vulnerability may be examined and confirmed, e.g., by a user.

In some cases, the vulnerability management system 110 may receive new scanner data from a second scanner 125 different from a first scanner 125 that provided previous scanner data (e.g., on a same day or different day). The vulnerability management system 110 may determine an asset of a finding in the new scanner data is a duplicate of an existing asset (with finding data of the previous scanner data); and merge findings, thereby ensuring consistency. For instance, the vulnerability management system 110 may determine the asset IDs, vulnerability IDs, and the key values for each finding match, and merge the new finding of the new scanner data from the second scanner 125 with the previous finding of the previous scanner data from the first scanner 125.

In some cases, the vulnerability management system 110 may perform vulnerability management actions using the at least one analytic data structure (e.g., the third analytic data structure), the finding data structure, and/or the trend data structure. For instance, the vulnerability management system 110 may perform one or combinations of: (1) transmit an alert to a defined endpoint for an asset indicated to have an active or discovered vulnerability (e.g., in accordance with an action rule for a group the asset belongs), (2) flag the group on login, (3) generate external ticket(s) and assign based on the group, (4) generate report(s) based on the group, and/or (5) trigger one or more automation rules based on the group. The vulnerability management system 110 may also update various graphics and/or statistics on various GUI for the user to view. For instance, in some cases, the vulnerability management system 110 may cause the indication of the change in the vulnerability status from the first time period to the second time period to be displayed to a user, thereby depicting a trend status (or metrics based thereon) to a user for corresponding assets (or groups, projects, or the organization 115 and the like).

Vulnerability Management System

Figure 3:
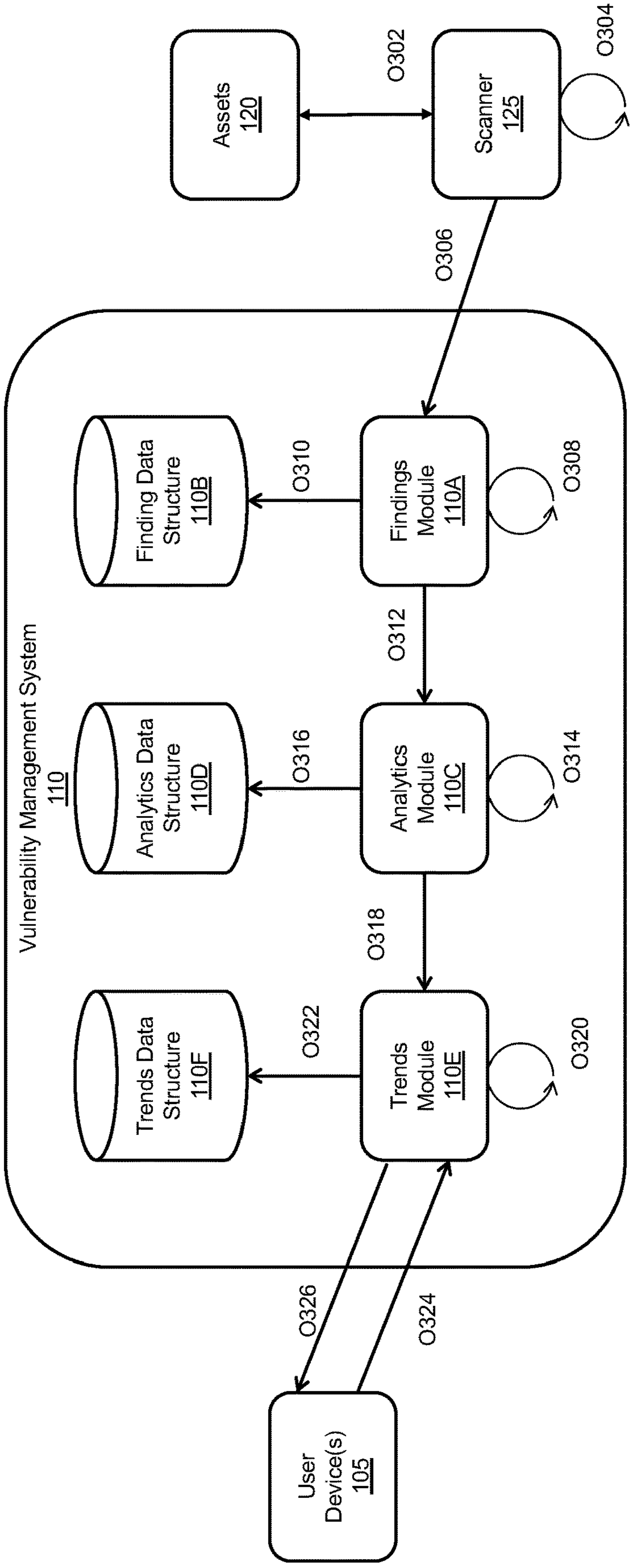
FIG. 3 depicts a block diagram depicting vulnerability detection and management in IT systems based on scan results.

FIG. 3 depicts a block diagram 300 depicting vulnerability management system 110 interacting with components of IT systems based on scan results. Diagram 300 depicts operations O302 through O326. Diagram 300 depicting vulnerability management system 110 interacting with components of IT systems based on scan results may apply to features of FIGS. 1 and 2 above. The vulnerability management system 110 may include findings module 110A, finding data structure 1106, analytics module 110C, analytics data structure 110D, trends module 110E, and trends data structure 110F. The operations O302 through O326 may include:

In operation O302, operation O302 may include the scanner 125 obtaining raw data about the plurality of assets 120 (or subsets thereof) of the organization 115. In some cases, the scanner 125 may obtain the raw data about the assets at a set interval (e.g., every day), in response to user request via user device 105, or in response to a new vulnerability being discovered (e.g., reported and classified) so as to scan for the new vulnerability.

In operation O304, operation O304 may include the scanner 125 processing the raw data about the plurality of assets (or subsets thereof) to generate scanner data. For instance, the scanner 125 may generate the scanner data based on analyzing the raw data about the plurality of assets 120 (or subsets thereof) to determine vulnerabilities on specific assets of the plurality of assets 120.

In operation O306, operation O306 may include the scanner 125 transmitting the scanner data to the findings module 110A. For instance, the scanner 125 may transmit the scanner data at set intervals or in response to a request from the findings module 110A.

In operation O308, operation O308 may include the findings module 110A determining a plurality of finding records based on the scanner data. For instance, the findings module 110A may determine an asset ID, vulnerability ID, and key value for each finding and generate a finding record for each finding.

In operation O310, operation O310 may include the findings module 110A storing the plurality of finding records in the finding data structure 1108.

In operation O312, operation O312 may include the findings module 110A transmitting an instruction to the analytics module 110C, to thereby trigger analytics processing.

In operation O314, operation O314 may include the analytics module 110C determining a plurality of analytics records based on the finding records and/or scanner data. For instance, the analytics module 110C may determine a scan key value and/or scan metrics, and generate relevant analytic records to store the analytics data in appropriate data structures, such as the analytics data structure 110D.

In operation O316, operation O316 may include the analytics module 110C storing the plurality of analytics records in the analytics data structure 110D.

In operation O318, operation O318 may include the analytics module 110C transmitting an instruction to the trends module 110E, to thereby trigger trends processing.

In operation O320, operation O320 may include the trends module 110E determining a plurality of trend records. For instance, the trends module 110E may determine changes in vulnerability status of assets over time, and generate trend records for the changes in the vulnerability status.

In operation O322, operation O322 may include the trends module 110E storing the plurality of trend records in the trends data structure 110F.

In operation O324, operation O324 may include the user device 105 transmitting asset group rules, vulnerability management action rules, and the like, to the trends module 110E. In this manner, the trends module 110E may group assets and perform vulnerability management actions in response to detecting a vulnerability on an asset, as discussed herein.

In operation O326, operation O326 may include the trends module 110E performing vulnerability management actions in response to detecting a vulnerability on an asset (s). For instance, the trends module 110E may detect a vulnerability for an asset of a group (e.g., in a finding record, an analytic record, or in a trend record), determine a vulnerability management action based on the group, and perform the vulnerability management action (e.g., display or transmit data about the vulnerability).

Determining and Managing Records in Vulnerability Management System

Figure 4A:
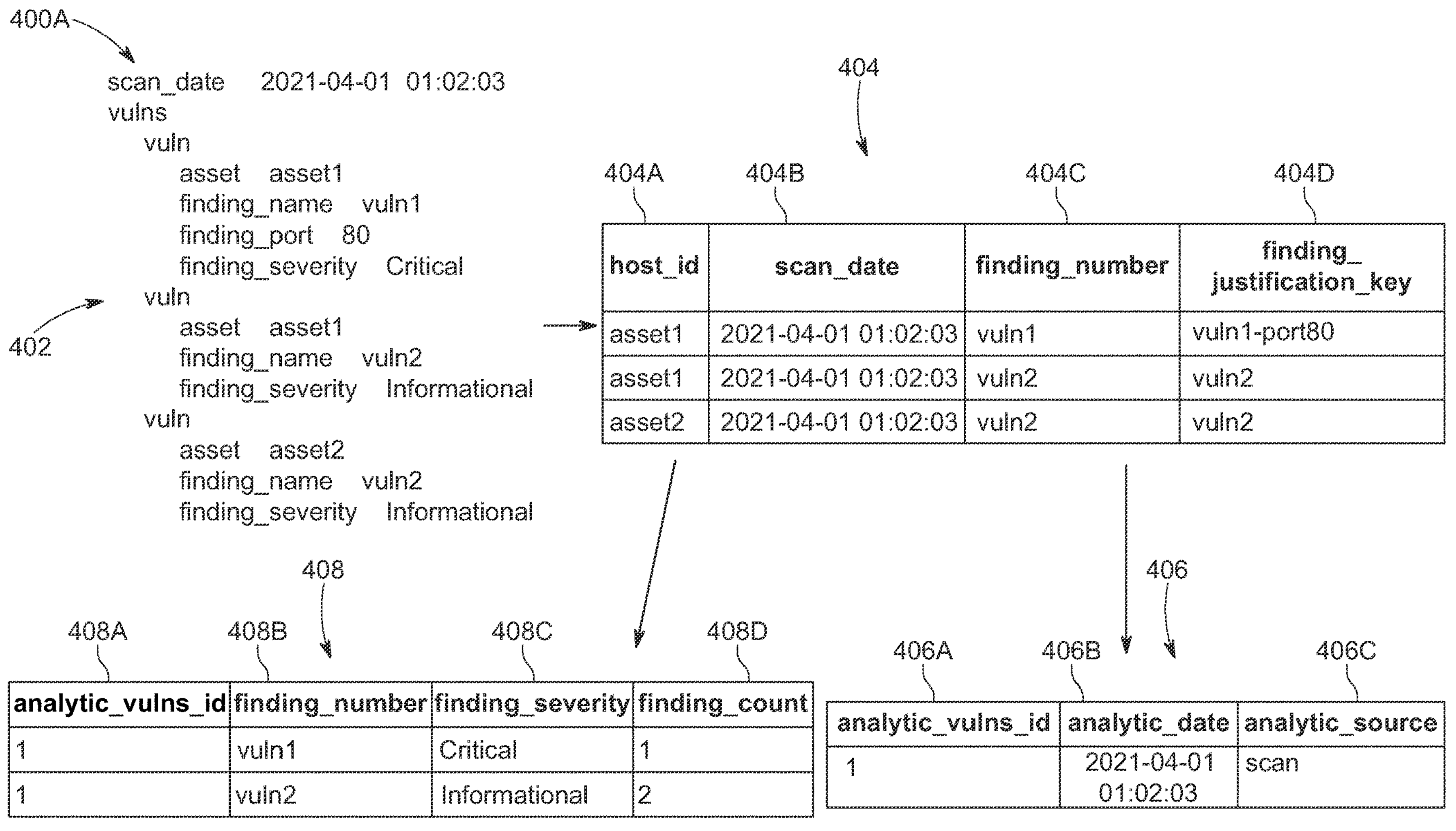
Figure 4B:
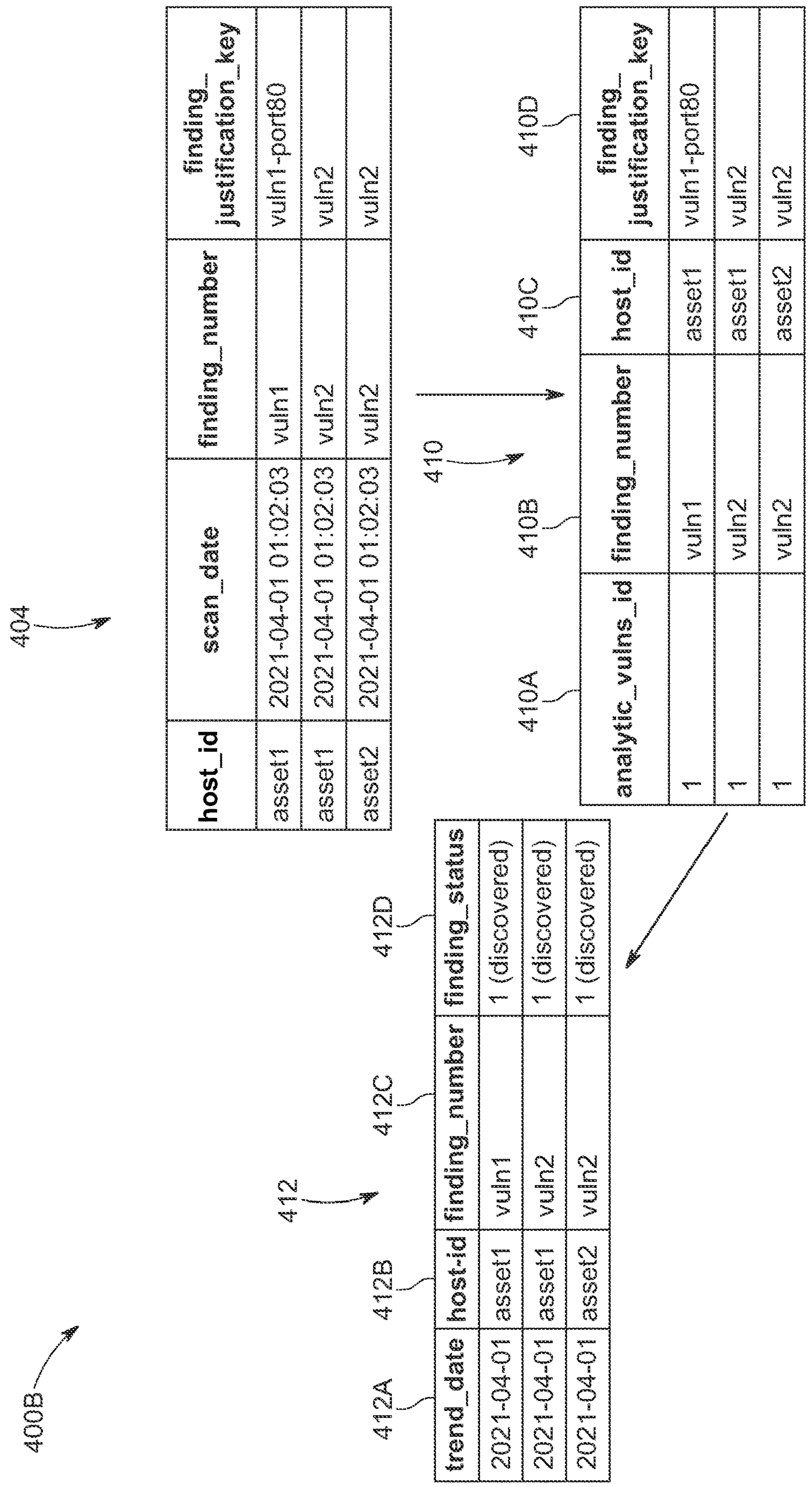
Figure 6A:
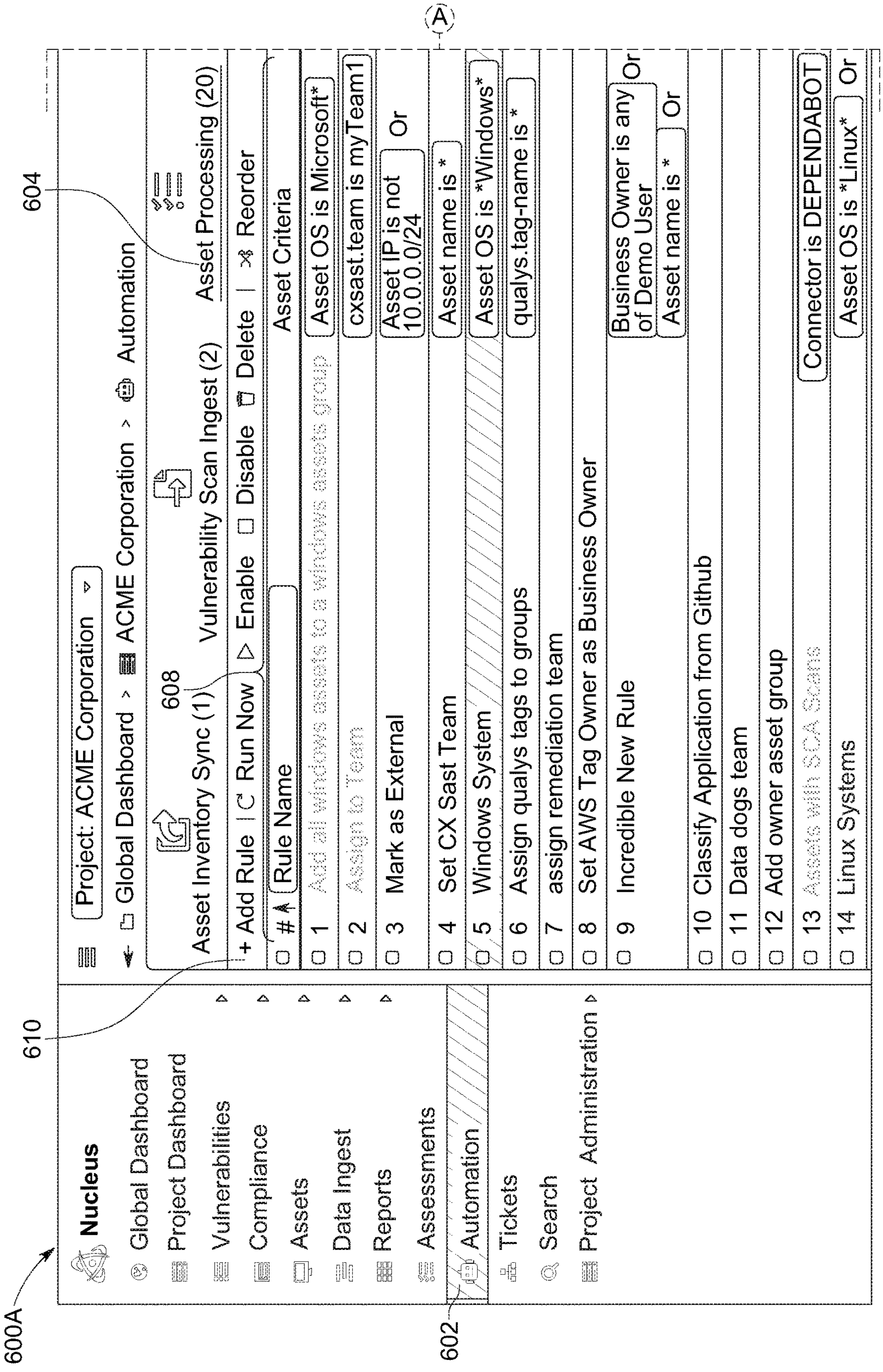
FIGS. 6A-6F depict graphical user interfaces (GUIs) for vulnerability detection and management.
Figure 6A:
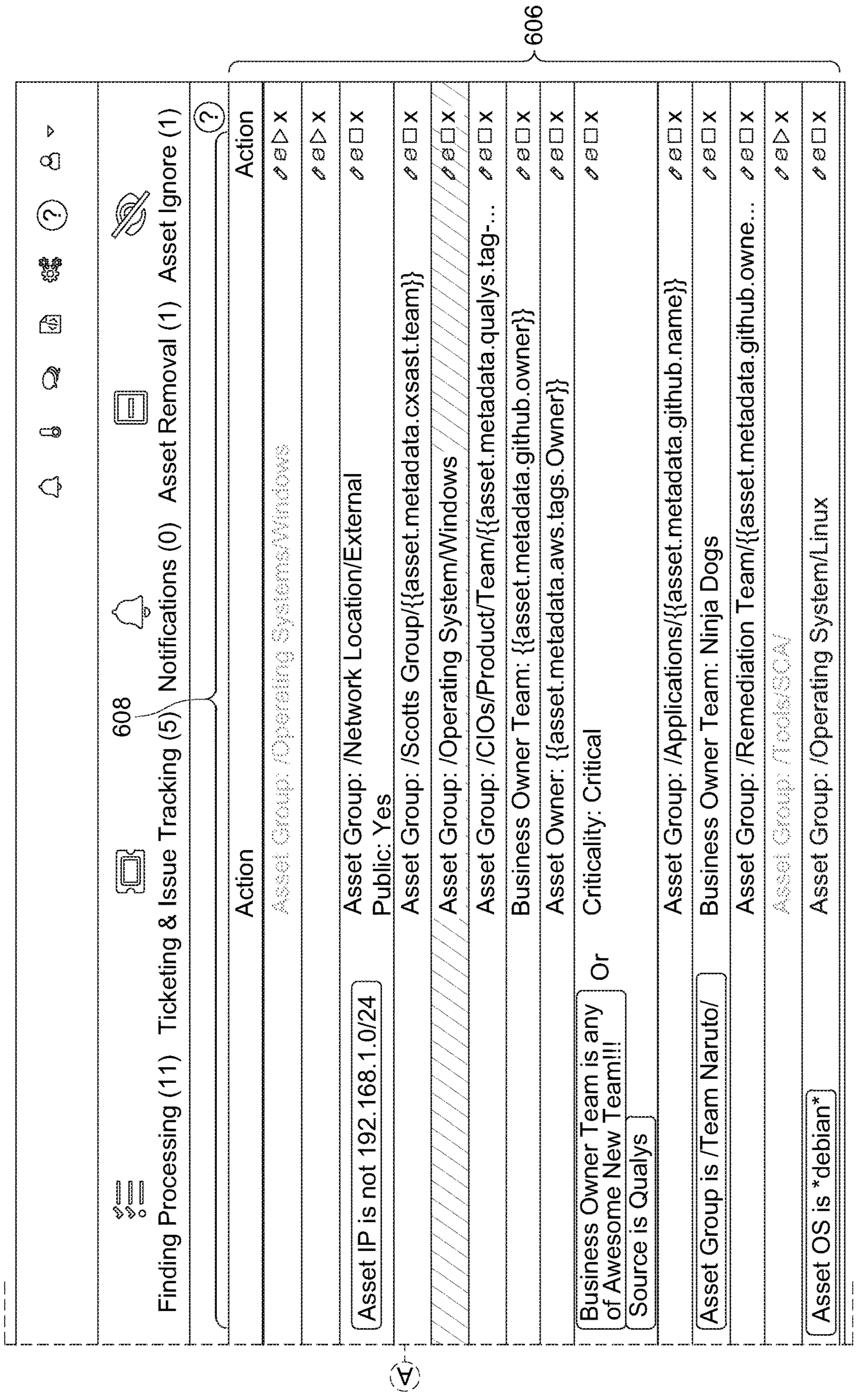
Figure 6B:
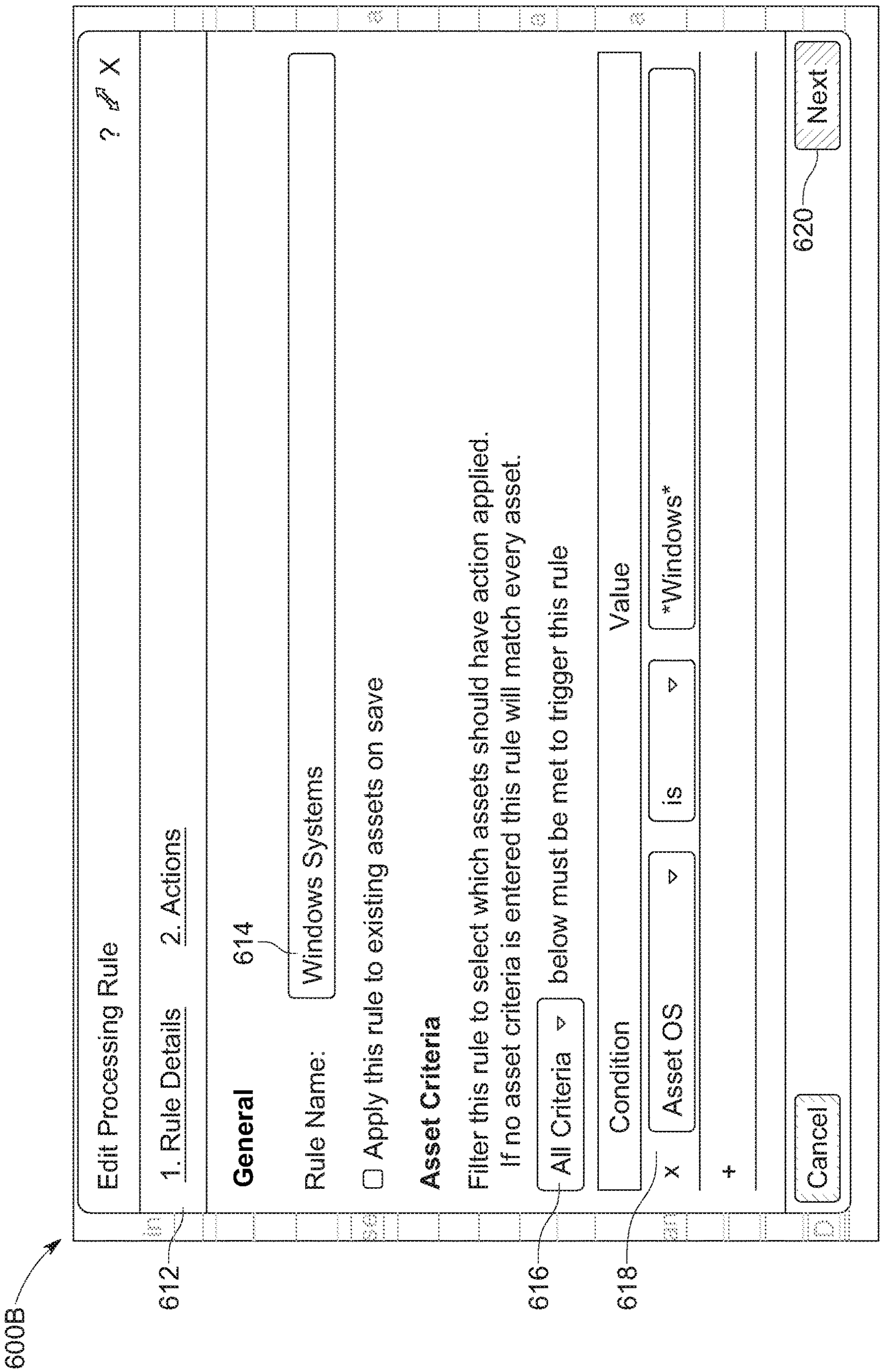
Figure 6C:
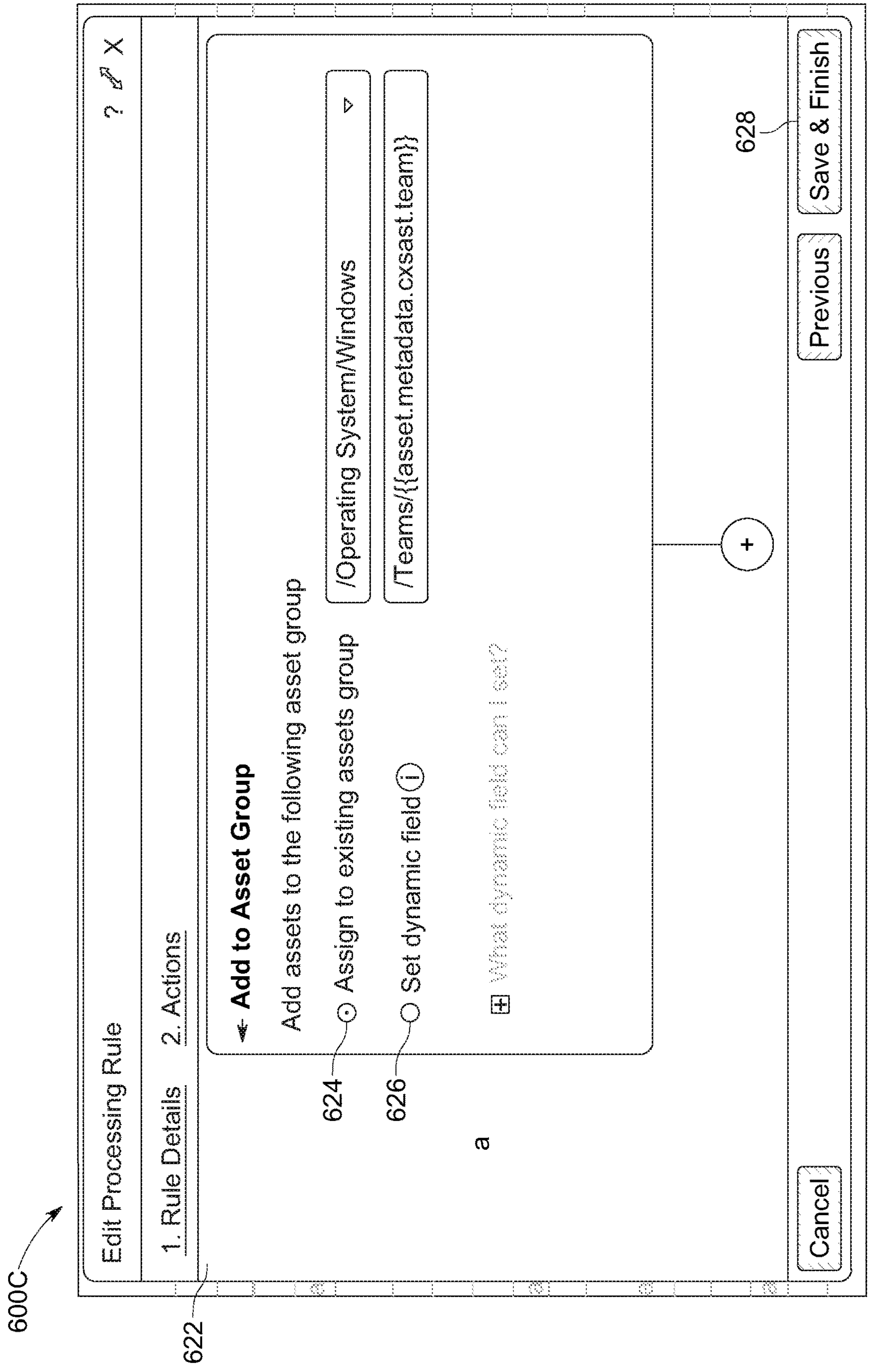
Figure 6D:
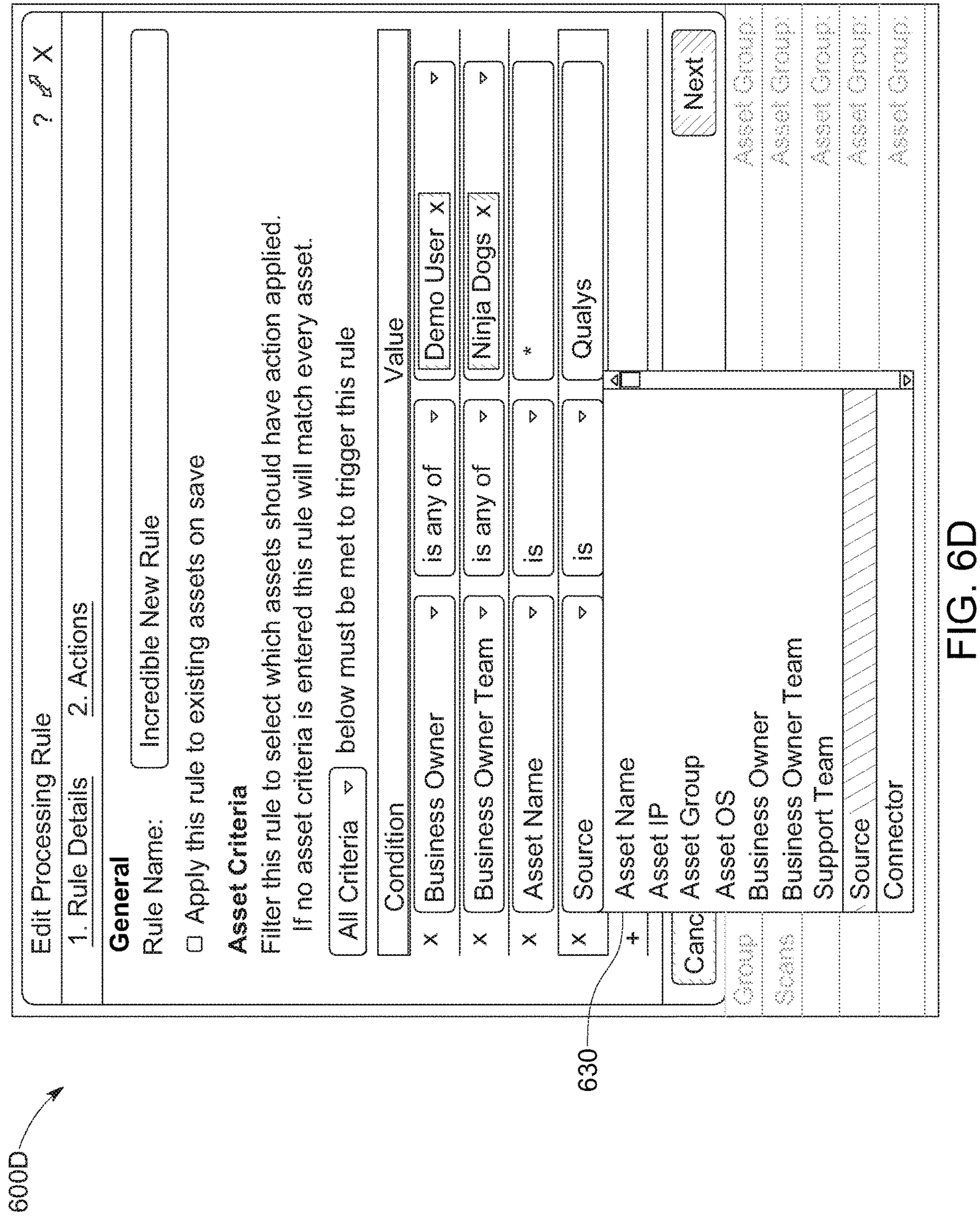
Figure 6E:
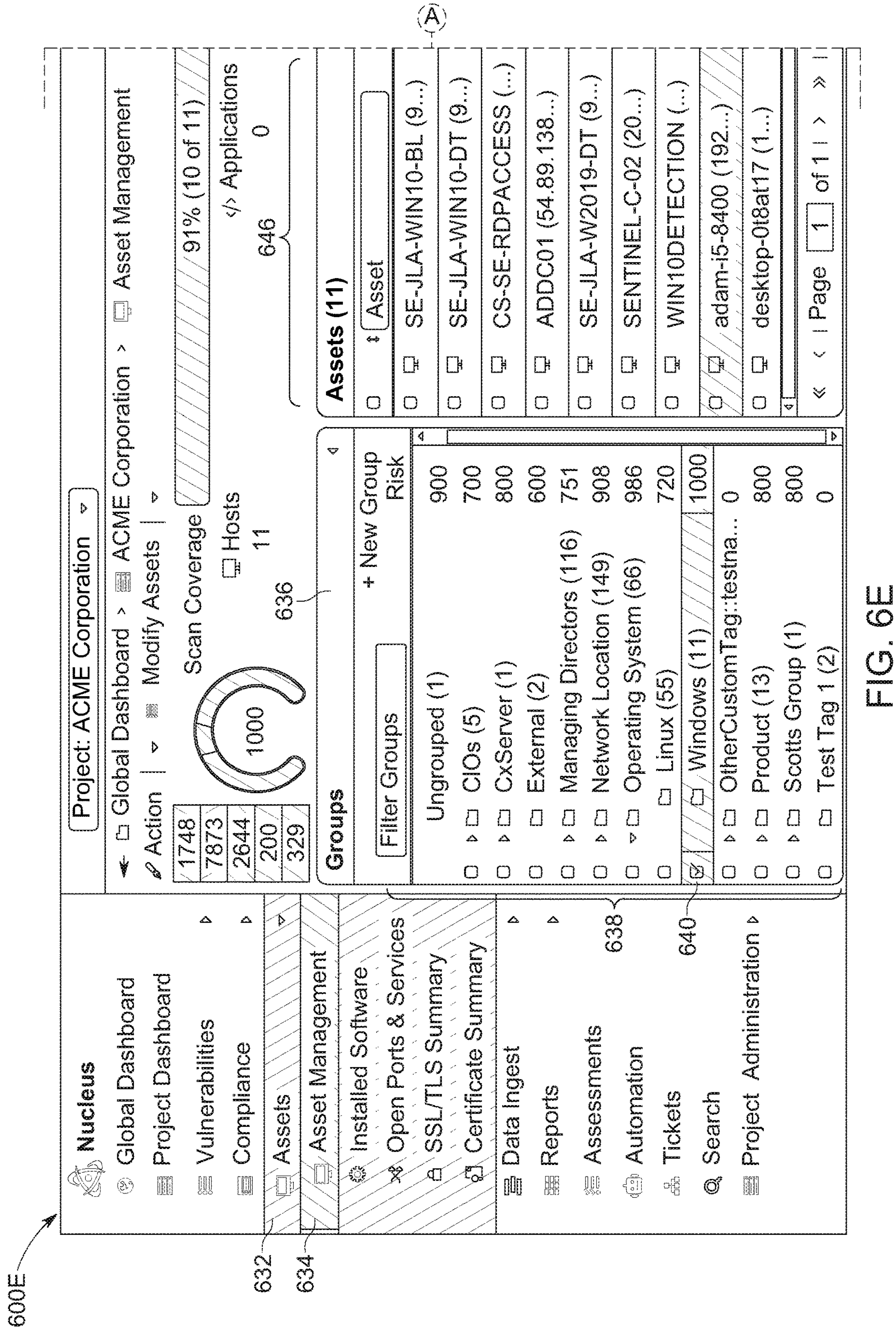
Figure 6E:
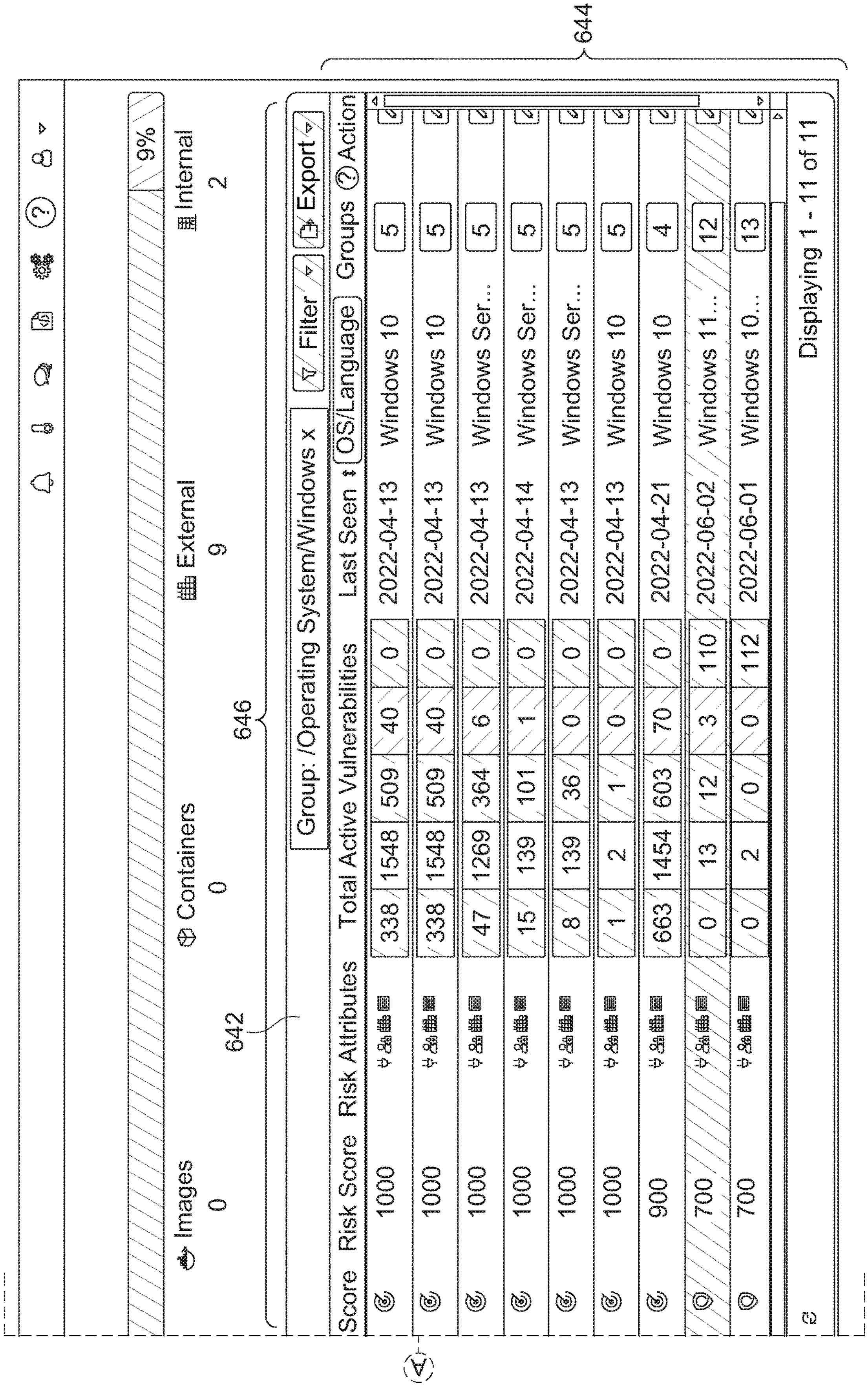
Figure 6F:
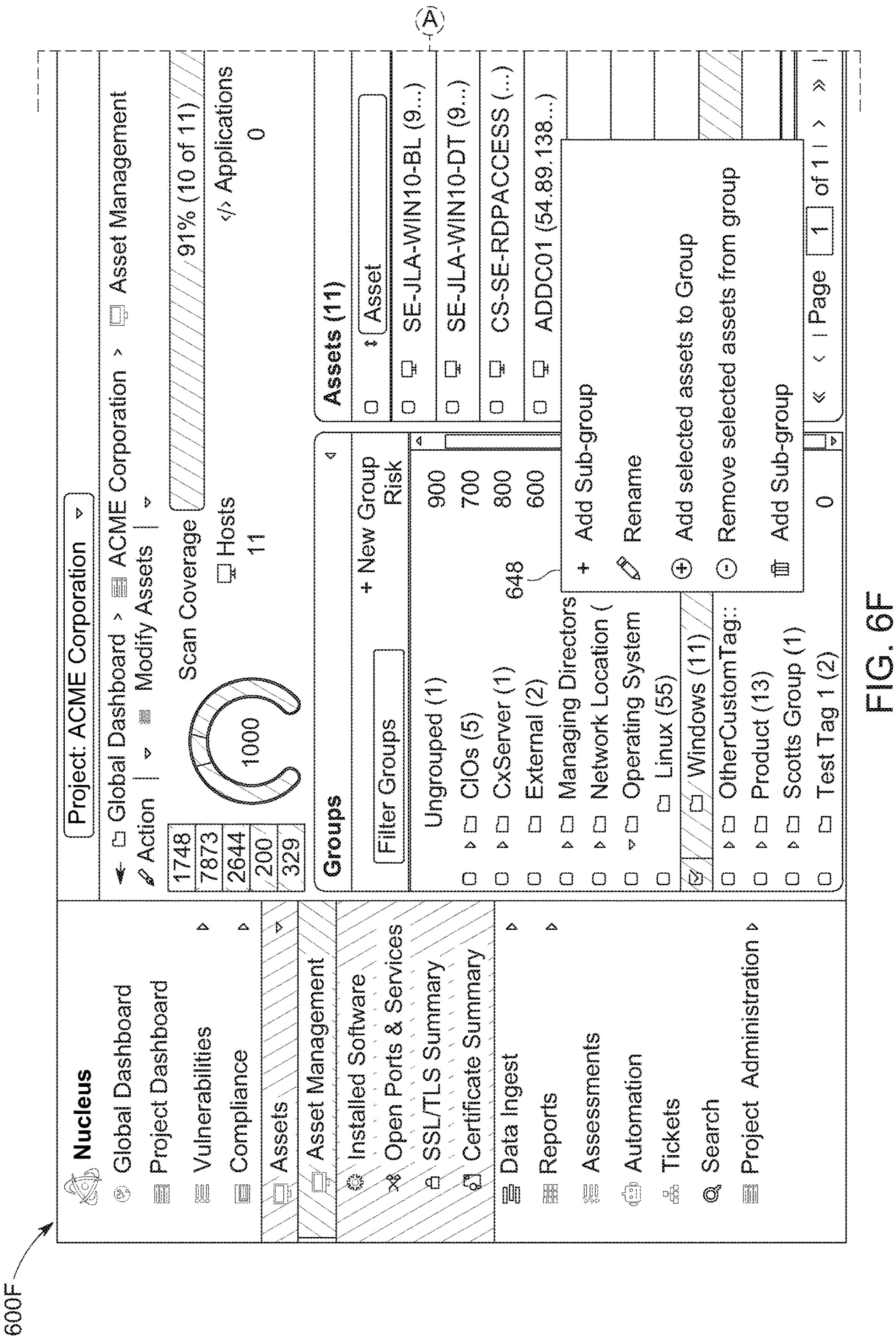
Figure 6F:
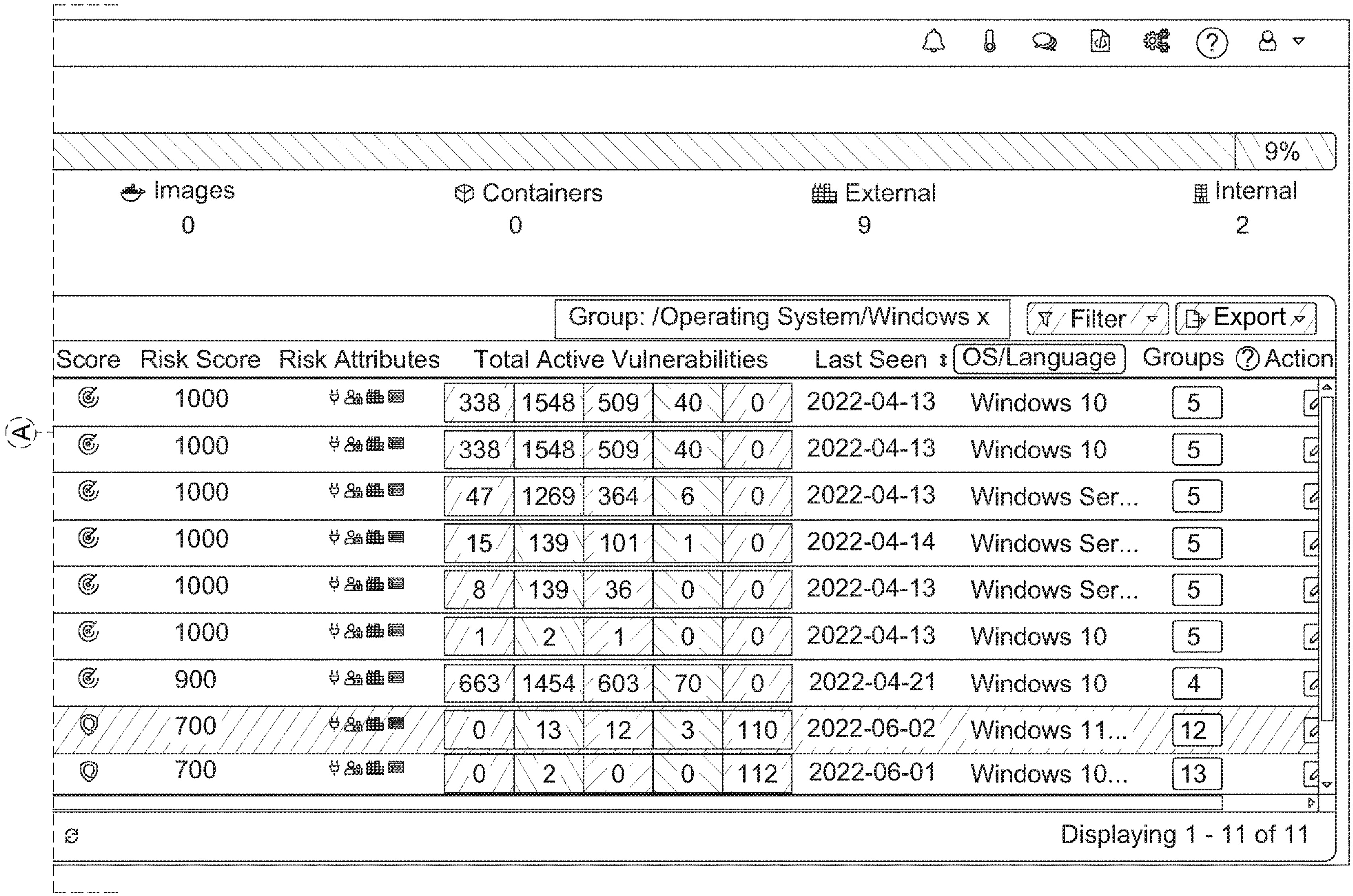

FIGS. 4A-4B and 5A-5B depict diagram 400A, diagram 400B, diagram 500A, and 500B of a vulnerability management system 110 determining and managing records for vulnerability detection and management in IT systems. The vulnerability management system 110 determining and managing records for vulnerability detection and management in IT systems in FIGS. 4A-4B and 5A-5B may apply to features of FIGS. 1, 2, and 3 above. FIGS. 4A-4B may depict the vulnerability management system 110 processing a first scanner data 402 at a first time (e.g., first date), while FIGS. 5A-5B may depict the vulnerability management system 110 processing a second scanner data 502 at a second time (e.g., a second date later than the first date).

The vulnerability management system 110 may generate a first set of finding records based on the first scanner data 402, and populate the first set of finding records in a findings table 404. The findings tables 404 may have columns for asset ID 404A, scan date 404B, vulnerability ID 404C, and key value 404D, and rows to store values for each finding record.

The vulnerability management system 110 may generate a first scan key value to differentiate a scan event for first scanner data 402 and generate first scan metrics for first scanner data 402, as discussed herein. The vulnerability management system 110 may then generate a first plurality of analytic records and store the first plurality of analytic records in respective analytic tables. For instance, the vulnerability management system 110 may store a first type of analytic record in a first analytic table 406; store a second type of analytic record in a second analytic table 408; and store a third type of analytic record in a third analytic table 410. The first analytic table 406 may have columns for scan key value 406A, scan date 406B, and source of scanner data 406C, and rows to store values for each first type of analytic record. In some cases, the first analytic table 406 may also have columns for roll-up metadata about analytics, such as total and/or unique number of findings, total and/or unique number of findings at various severities, and the like. The second analytic table 408 may have columns for scan key value 408A, vulnerability ID 4088, severity level 408C, and scan metrics 408D, and rows to store values for each second type of analytic record. In some cases, the second analytic table 408 may also have columns for additional metadata about analytics, such as roll-up numbers from the third analytic table 410. The third analytic table 410 may have columns for scan key value 410A, vulnerability ID 4106, asset ID 410C, and key value 410D, and rows to store values for each third type of analytic record.

The vulnerability management system 110 may generate a first plurality of trend records based on at least records in the findings table 404 and/or the third analytic table 410. The vulnerability management system 110 may store the trend records in a trend table 412. The trend table 412 may have columns for trend date 412A, asset ID 4128, vulnerability ID 412C (or key value), and trend status 412D, and rows to store values for each trend record.

The vulnerability management system 110 may perform vulnerability management actions using the third analytic table 410, the findings table 404, and/or the trend table 412, as updated after (or during) processing of the first scanner data 402. For instance, when a finding record is added to the findings table 404 or a trend status is determined, the vulnerability management system 110 may update a display of vulnerability data or trend status for the asset, transmit alerts for the asset and/or group the asset belongs to, and the like, as discussed herein.

Subsequently, the vulnerability management system 110 may receive the second scanner data 502. The vulnerability management system 110 may generate a second set of finding records 504 based on the second scanner data 502 and populate the second set of finding records 504 in the findings table 404.

The vulnerability management system 110 may generate a second scan key value to differentiate a scan event for second scanner data 502 and generate second scan metrics for the second scanner data 502, as discussed herein. The vulnerability management system 110 may then generate a second plurality of analytic records and store the second plurality of analytic records in respective analytic tables. For instance, the vulnerability management system 110 may store a first type of analytic record 506 for the second scanner data in the first analytic table 406; store a second type of analytic record 508 in the second analytic table 408; and store a plurality of third type of analytic records 510 in the third analytic table 410.

The vulnerability management system 110 may generate a second plurality of trend records 512 based on at least records in the findings table 404 and/or the third analytic table 410. The vulnerability management system 110 may store the second plurality of trend records 512 in the trend table 412.

The vulnerability management system 110 may perform vulnerability management actions using the third analytic table 410, the findings table 404, and/or the trend table 412, as updated after (or during) processing of the second scanner data 502. For instance, when a finding record is added to the findings table 404 or a trend status is determined, the vulnerability management system 110 may update a display of vulnerability data or trend status for the asset, transmit alerts for the asset and/or group the asset belongs to, and the like, as discussed herein.

Graphical User Interfaces for Vulnerability Management System

FIGS. 6A-6F depict GUIs 600A-600F for vulnerability detection and management. The GUIs 600A-600F for vulnerability detection and management may apply to features of FIGS. 1, 2, 3, 4A-4B and 5A-5B above.

In GUI 600A, GUI 600A may depict an automation user interface 602 (e.g., displayed on a user device 105 in response to data provided from the vulnerability management system 110). The automation user interface 602 may include various sections (not depicted), such as asset inventory sync section for asset inventory sync rules, vulnerability scan ingest section for vulnerability scan ingest rules, finding processing section for finding processing rules, ticketing and issue tracking section for ticketing and issue tracking rules, notification section for notification rules, asset removal section for asset removal rules, asset ignore section for asset ignore rules, and the like. A currently displayed section of the automation user interface 602 may be an asset processing section 604 for asset processing rules. For instance, active asset grouping rules 606 may be displayed in the asset processing section 604, with various columns 608 of data for the asset grouping rules, such as name, condition, action, and the like. The asset processing section 604 may also include an add rule element 610. The add rule element 610 may be selectable by a user input to generate a new asset grouping rule.

In GUI 600B, GUI 600B may depict processing rule interface 612 in response to a user input selecting the add rule element 610. The processing rule interface 612 may have a name input field 614, a first condition element 616, and a second condition element 618. The name input field 614 may receive user inputs (e.g., alphanumeric text) to name a grouping rule. The first condition element 616 may be a selector to define a logical operator on conditions set by the second condition element 618. The second condition element 618 may be user selectable to define conditions on values of attributes of assets. The processing rule interface 612 may include a continue element 620. The continue element 620 may be user selectable by a user input to continue to an action interface 622

In GUI 600C, GUI 600C may depict the action interface 622 in response to a user input on the continue element 620. The action interface 622 may include a first action element 624 and a second action element 626. The first action element 624 may be user selectable to define an asset group (e.g., from a selection window of existing asset groups) to add an asset that satisfies the logical operator and conditions set by the second condition element 618. The second action element 626 may be user selectable to map a data bit of an asset to a dynamic field. If a user configures the second action element 626, the vulnerability management system 110 may extract data (e.g., a piece of metadata) for the asset and generate a dynamic field for the asset. In some cases, the vulnerability management system 110 may pass the dynamic field (populated with the extracted data) to a process rule. The process rule may be system defined or user defined so as to perform certain actions based on the value of the dynamic field. For instance, a process rule could generate a new group for the value of the dynamic field or add an asset to an already existing group for the value of the dynamic field. As an example, the second action element 626 may enable a user to pull metadata from the asset and dynamically apply the metadata to a host group. In particular, if a first asset had metadata business Person set to person1, then a process rule could add the first asset to a group based on "businessperson," and the asset could be assigned to a group called "person1." For instance, if the first time "businessperson" is set to person1, the vulnerability management system 110 may generate the group called "person1" and assign the first asset to the group called "person 1." Similarly, if a second asset had metadata businessperson set to person2, the process rule could add the second asset to a group called "person2." Similarly, if a third asset had metadata businessperson set to person1, the process rule could add the third asset to the group called "person1." The action interface 622 may include a save and finish element 628. The save and finish element 628 may be user selectable to finish the asset grouping rule. For instance, the user device 105 may transmit the new asset grouping rule to the vulnerability management system 110 in response to a user input selecting the save and finish element 628.

In GUI 600D, GUI 600D may depict a more complex asset grouping rule and a selection menu element 630. The selection menu element 630 may display different attributes of assets to form conditions. The conditions may include a logical expression on a value of an attribute, a logical operator (is, is not, is any of, and the like), and a conditional value (e.g., a threshold, a name, an ID, and the like).

In GUI 600E, GUI 600E may depict an assets interface 632. The assets interface 632 may be displayed in response a user selecting the assets interface 632 or in response to user input selecting the save and finish element 628 (e.g., user device 105 transmitting the new asset grouping rule to the vulnerability management system 110, which may process it (e.g., validate the new asset grouping rule), associate assets to groups based on the new asset grouping rule, and transmit data (e.g., webpage or application interface) back to the user device 105). The assets interface 632 may have several sections, including (not depicted) an installed software section, an open ports and service section, SSL/TLS summary section, and a certificate summary section. A currently displayed section of the assets interface 632 may be an asset management section 634 for displaying groups and assets in those groups, along with data related thereto. For instance, the groups 638 may be displayed in a group section 636. A group 640 of the groups 638 may be selected (e.g., by a user input) to display assets 644 of the group 640 in asset section 642. Asset section 642 may include various columns 646 of data for each asset in the group 640.

In GUI 600F, GUI 600F may depict a modify interface 648 in response to a user input (e.g., right click) on a group (e.g., group 640) in group section 636. The modify interface 648 may allow a user to perform one or more actions for the group, such as add a sub-group (e.g., generate a new group under the group and inherent aspects of the group), rename the group, delete the group, and/or modify assets in group (e.g., add assets to group, remove assets from group).

Example Routine(s)

Figure 7:
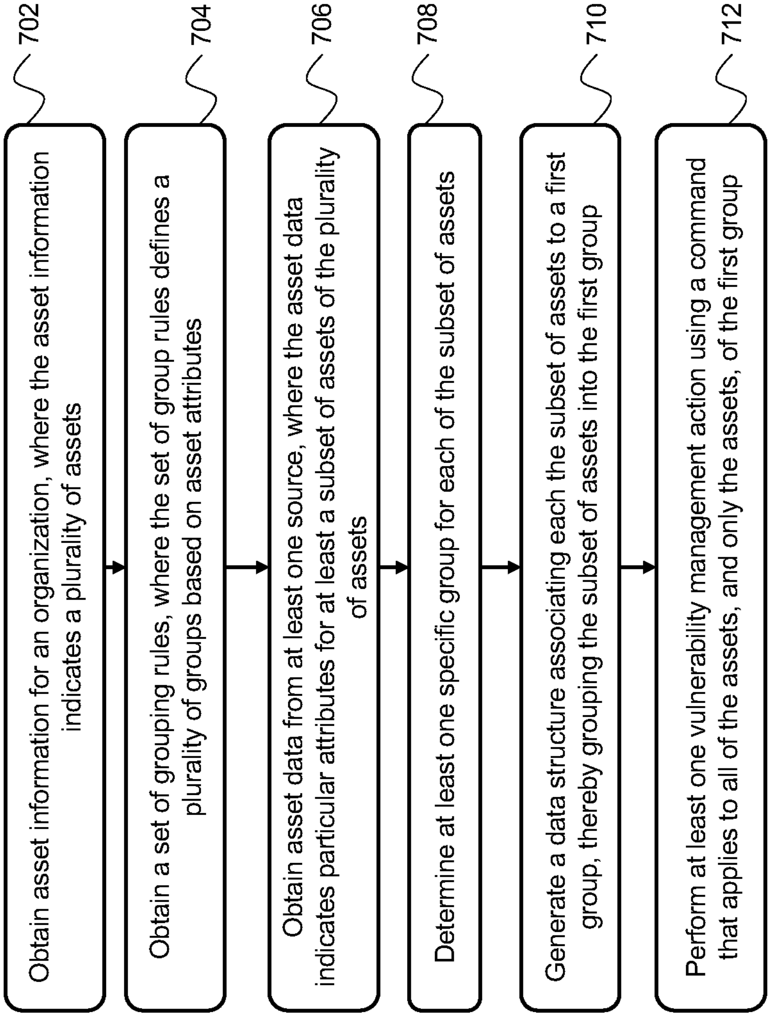
FIG. 7 depicts a flowchart of an exemplary routine for vulnerability detection and management using asset grouping rules.

FIG. 7 depicts a flowchart of an exemplary routine 700 for vulnerability detection and management using asset grouping rules. The routine 700 for vulnerability detection and management using asset grouping rules may apply to features of FIGS. 1, 2, 3, 4A-4B, 5A-5B, and 6A-6F above. In the routine 700, the routine 700 may be performed by one or more systems, such as the vulnerability management system 110 and/or at least one scanner 125

The routine 700 may start at block 702, where the vulnerability management system 110 may obtain asset information for an organization, where the asset information indicates a plurality of assets. For instance, the vulnerability management system 110 may receive a list of assets from an asset management service or scanner 125, as discussed herein.

At block 704, the vulnerability management system 110 may obtain a set of grouping rules, where the set of group rules defines a plurality of groups based on asset attributes. For instance, the vulnerability management system 110 may receive user inputs and/or data to define asset grouping rules, as discussed herein.

At block 706, the vulnerability management system 110 may obtain asset data from at least one source, where the asset data indicates particular attributes for at least a subset of assets of the plurality of assets. For instance, the vulnerability management system 110 may obtain the asset metadata for the subset of assets, as discussed herein.

At block 708, the vulnerability management system 110 may determine at least one specific group for each of the subset of assets. For instance, the vulnerability management system 110 may apply asset grouping rules and/or user inputs to group each asset into at least one group, as discussed herein.

At block 710, the vulnerability management system 110 may generate a data structure associating each the subset of assets to a first group, thereby grouping the subset of assets into the first group. For instance, the vulnerability management system 110 may store the association so that vulnerability management action may be determined, as discussed herein.

At block 712, the vulnerability management system 110 may perform at least one vulnerability management action using a command that applies to all of the assets, and only the assets, of the first group. For instance, the vulnerability management system 110 may detect a vulnerability of an asset of the first group and perform a vulnerability management action associated with the first group, as discussed herein. In some cases, the vulnerability management system 110 may perform a vulnerability management action that applies to a higher level group (if the asset is in a nested group). Generally, the vulnerability management system 110 may have a plurality vulnerability management actions that are triggered for different assets and/or groups in accordance with trigger conditions (e.g., asset has vulnerability detected). Some vulnerability management actions may be triggered for specific groups and/or specific assets (e.g., transmit a message to an endpoint associated with that specific group and/or specific asset), while some vulnerability management actions may apply to all assets and/or groups (e.g., displaying data associated therewith), as discussed herein.

Figure 8:
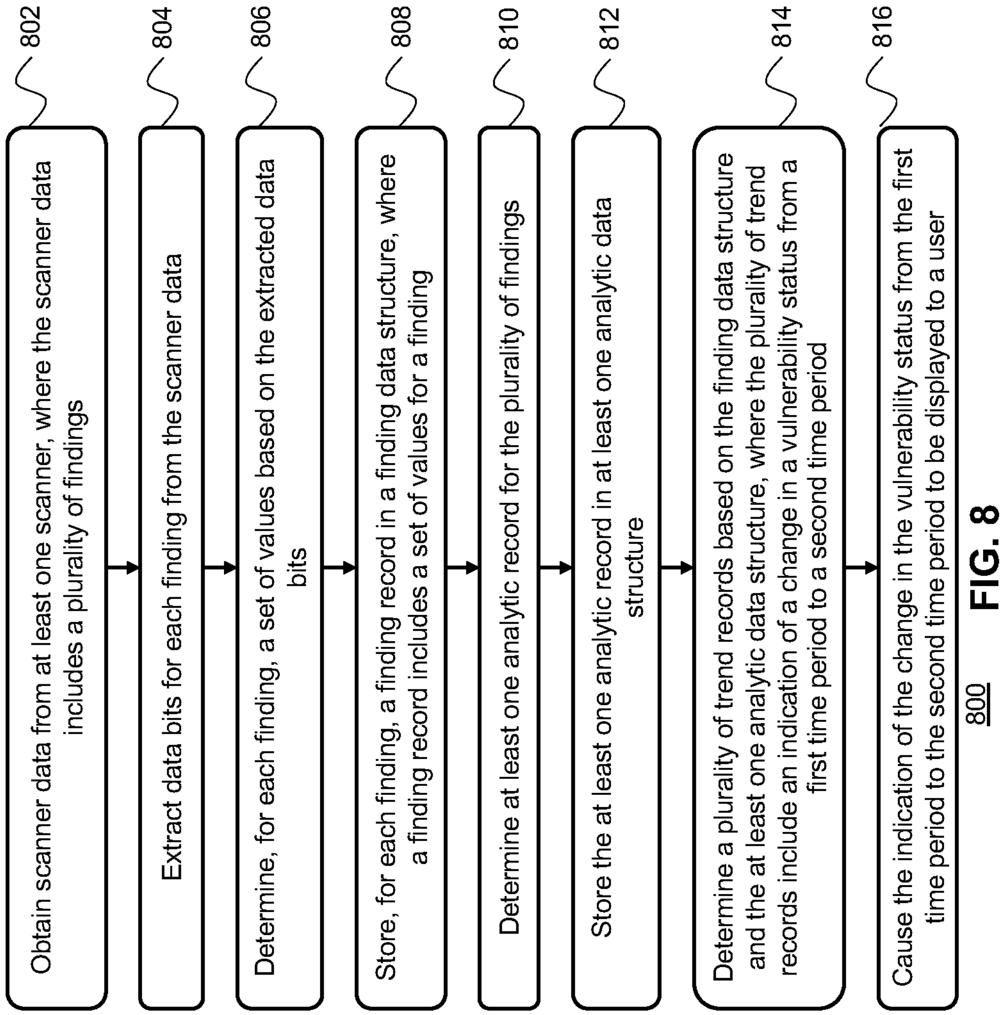
FIG. 8 depicts a flowchart of an exemplary routine for vulnerability detection and management with a determination of trend records.

FIG. 8 depicts a flowchart of an exemplary routine 800 for vulnerability detection and management with a determination of trend records. The routine 800 for vulnerability detection and management with a determination of trend records may apply to features of FIGS. 1, 2, 3, 4A-4B, 5A-5B, 6A-6F, and 7 above. In the routine 800, the routine 800 may be performed by one or more systems, such as vulnerability management system 110.

The routine 800 may start at block 802, where the vulnerability management system 110 may obtain scanner data from at least one scanner, where the scanner data includes a plurality of findings. For instance, the vulnerability management system 110 may request or periodically receive scanner data from a scanner 125, as discussed herein.

At block 804, the vulnerability management system 110 may extract data bits for each finding from the scanner data. For instance, the vulnerability management system 110 may parse the scanner data using a scanner model and extract the data bits for each finding, as discussed herein.

At block 806, the vulnerability management system 110 may determine, for each finding, a set of values based on the extracted data bits. For instance, the vulnerability management system 110 may determine an asset ID, a vulnerability ID, and a key value, as discussed herein.

At block 808, the vulnerability management system 110 may store, for each finding, a finding record in a finding data structure, where a finding record includes a set of values for a finding. For instance, the vulnerability management system 110 may store finding records for the scanner data for storage, analytics, and vulnerability management actions, as discussed herein.

At block 810, the vulnerability management system 110 may determine at least one analytic record for the plurality of findings. For instance, the vulnerability management system 110 may determine a scan key value and scan metrics, and generate a first type of analytic record, one or more second type of analytic records, and one or more third type of analytic records, as discussed herein.

At block 812, the vulnerability management system 110 may store the at least one analytic record in at least one analytic data structure. For instance, the vulnerability management system 110 may store the analytic records for storage, analytics, and vulnerability management actions, as discussed herein.

At block 814, the vulnerability management system 110 may determine a plurality of trend records based on the finding data structure and the at least one analytic data structure, where the plurality of trend records include an indication of a change in a vulnerability status from a first time period to a second time period. For instance, the vulnerability management system 110 may determine trend statuses based on analytic records and finding records, and generate trend records for the trend statuses and corresponding vulnerabilities (e.g., vulnerability ID, key value, and asset ID), as discussed herein.

At block 816, the vulnerability management system 110 may cause the indication of the change in the vulnerability status from the first time period to the second time period to be displayed to a user. For instance, the vulnerability management system 110 may update data in a user interface, transmit an alert, and the like, as discussed herein.

Computer System

Figure 9:
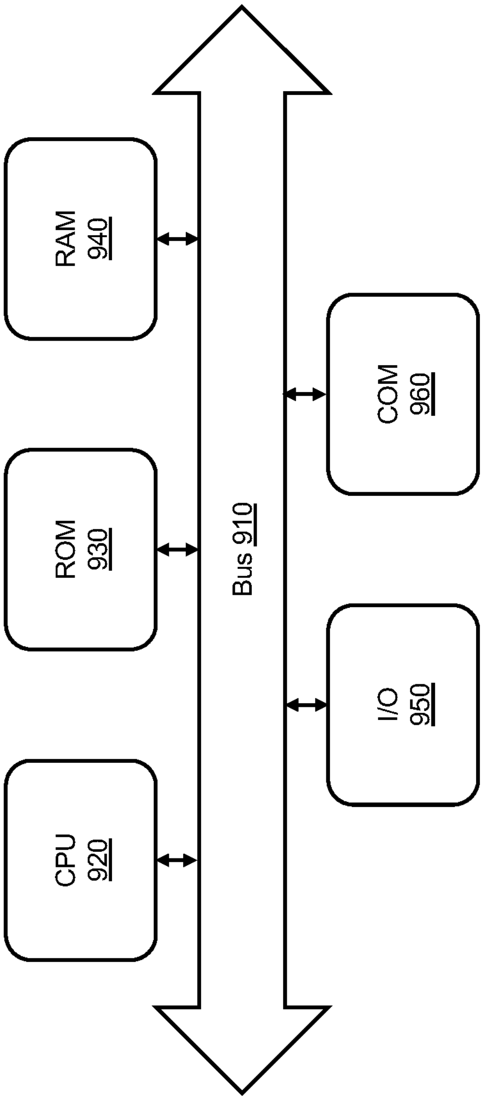
FIG. 9 depicts an example system that may execute techniques presented herein.

FIG. 9 depicts an example system configured to execute techniques presented herein. FIG. 9 is a simplified functional block diagram of a computer configured to execute techniques described herein, according to exemplary cases of the present disclosure. Specifically, the computer (or "platform" as it may not be a single physical computer infrastructure) may include a data communication interface 960 for packet data communication. The platform may also include a central processing unit 920 ("CPU 920"), in the form of one or more processors, for executing program instructions. The platform may include an internal communication bus 910, and the platform may also include a program storage and/or a data storage for various data files to be processed and/or communicated by the platform such as ROM 930 and RAM 940, although the system 900 may receive programming and data via network communications. The system 900 also may include input and output ports 950 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

EXAMPLES

Clause 1. A system for vulnerability detection and management, the system comprising: at least one processor; and at least one memory storing instructions, wherein the system is configured to: obtain asset information for an organization, wherein the asset information indicates a plurality of assets; obtain a set of grouping rules, wherein the set of grouping rules defines a plurality of groups based on asset attributes; obtain asset data from at least one source, wherein the asset data indicates particular attributes for at least a subset of assets of the plurality of assets; determine at least one specific group for each of the subset of assets; generate a data structure associating each the subset of assets to a first group, thereby grouping the subset of assets into the first group; and perform at least one vulnerability management action using a command that applies to all of the assets, and only the assets, of the first group.

Clause 2. The system of Clause 1, wherein, to obtain the asset information for the organization, the system is configured to: use a scanning tool to generate finding information; and extract the asset information from the finding information.

Clause 3. The system of Clauses 1 or 2, wherein, to obtain the set of grouping rules, the system is configured to: (1) receive user interactions with a web user interface to generate conditions to define the set of grouping rules, (2) receive a user upload of a file including a syntax-correct data structure that indicates conditions to define the set of grouping rules, and/or (3) receive data at an API to provide conditions to define the set of grouping rules.

Clause 4. The system of Clauses 1, 2, or 3, wherein, to obtain the asset data from the at least one source, the system is configured to: (1) obtain data for specific assets by user interactions with a web user interface and/or file upload, or (2) obtain data from one or more APIs.

Clause 5. The system of Clauses 1, 2, 3, or 4, wherein the plurality of groups includes at least one or more layers of a hierarchy of groups.

Clause 6. The system of Clause 5, wherein the one or more layers of the hierarchy of groups includes at least a first layer of groups and a second layer of groups.

Clause 7. The system of Clause 6, wherein a subset of groups in the second layer of groups are nested under a group in the first layer of groups.

Clause 8. The system of Clause 7, wherein the subset groups in the second layer of groups nested under the group in the first layer share a same attribute as the group in the first layer.

Clause 9. The system of Clause 5, wherein the one or more layers include up to a predetermined number of layers.

Clause 10. The system of any of Clauses 1-9, wherein, to determine a group for an asset, the system is configured to: (1) determine attributes for the asset; (2) determine a grouping rule for the group is satisfied by the attributes for the asset; and (3) associate the asset with the group.

Clause 11. The system of Clause 10, wherein the system is further configured to, if the group associated with the asset is a nested group: associate the asset with each parent group in each higher order layer.

Clause 12. The system of any of Clauses 1-11, wherein an asset is associated to multiple groups.

Clause 13. The system of any of Clauses 1-12, wherein each asset is associated to only one lowest level group.

Clause 14. The system of any of Clauses 1-13, wherein an asset is associated to multiple lowest level groups.

Clause 15. The system of any of Clauses 1-14, wherein the system is configured to: (1) obtain new asset data from the at least one source, and (2) update the data structure to add assets to, remove assets from, or move assets between groups of the plurality of groups based on the new asset data.

Clause 16. The system of any of Clauses 1-15, wherein the system is configured to: detect vulnerability(s) for assets of the subset of assets and/or groups of the plurality of groups; and perform one or combinations of: display the vulnerability(s) for the assets based on the groups, or display summaries of the vulnerability(s) of the assets on a group-basis.

Clause 17. The system of any of Clauses 1-16, wherein, to perform the at least one vulnerability management action using the command that applies to all of the assets, and only the assets, of the first group, the system is configured to: detect a vulnerability for an asset of the first group, and perform one or combinations of: (1) transmit an alert to a defined endpoint for the asset and/or first group, (2) flag the first group on login, (3) generate external ticket(s) and assign based on the first group, (4) generate report(s) based on the first group, and/or (5) trigger one or more automation rules based on the first group.

Clause 18. The system of any of Clauses 1-17, wherein the system is configured to: obtain service data indicating tags for assets to associate the assets with a particular service, wherein the assets associated with the particular service comprise a full stack including device, OS, and/or web application, thereby forming a service group based on the tags and a service grouping rule; detect a vulnerability for an asset of the service group; and perform one or combinations of: (1) transmit an alert for the service group, (2) flag the service group on login, (3) generate external ticket(s) and assign based on the service group, (4) generate report(s) based on the service group, and/or (5) trigger one or more automation rules based on the service group.

Clause 19. The system of any of Clauses 1-18, wherein the system is configured to: obtain an organizational hierarchy; map assets onto portions of the organizational hierarchy and associate the assets with the portions of the organizational hierarchy; detect a vulnerability for an asset of a portion of organizational hierarchy; and perform one or combinations of: (1) transmit an alert for the portion of organizational hierarchy, (2) flag the portion of organizational hierarchy on login, (3) generate external ticket(s) and assign based on the portion of organizational hierarchy, (4) generate report(s) based on the portion of organizational hierarchy, and/or (5) trigger one or more automation rules based on the portion of organizational hierarchy.

Clause 20. A computer-implemented method for vulnerability detection and management, comprising: obtaining asset information for an organization, wherein the asset information indicates a plurality of assets; obtaining a set of grouping rules, wherein the set of grouping rules defines a plurality of groups based on asset attributes; obtaining asset data from at least one source, wherein the asset data indicates particular attributes for at least a subset of assets of the plurality of assets; determining at least one specific group for each of the subset of assets based on the set of grouping rules and the particular attributes; generating a data structure associating each the subset of assets to a first group, thereby grouping the subset of assets into the first group; and performing at least one vulnerability management action using a command that applies to all of the assets, and only the assets, of the first group.

Clause 21. A system comprising: at least one processor; and at least one memory storing instructions, wherein the system is configured to: obtain scanner data from at least one scanner, wherein the scanner data includes a plurality of findings; extract data bits for each finding from the scanner data; determine, for each finding, a set of values based on the extracted data bits; store, for each finding, a finding record in a finding data structure, wherein a finding record includes a set of values for a finding; determine at least one analytic record for the plurality of findings; store the at least one analytic record in at least one analytic data structure; determine a plurality of trend records based on the finding data structure and the at least one analytic data structure, wherein the plurality of trend records include an indication of a change in a vulnerability status from a first time period to a second time period; cause the indication of the change in the vulnerability status from the first time period to the second time period to be displayed to a user.

Clause 22. The system of Clause 21, wherein, to extract the data bits for each finding from the scanner data, the system is configured to: determine a type of scanner; determine a scanner model based on the type of scanner; and extract, for each finding, the data bits for the finding using the scanner model.

Clause 23. The system of Clauses 21 or 22, wherein, to determine, for each finding, the set of values, the system is configured to: normalize the data bits for a finding into a defined format; determine an asset ID for an asset for the finding; determine a vulnerability ID for the finding; and set at least the asset ID and the vulnerability ID as the set of values.

Clause 24. The system of Clause 23, wherein, to determine the asset ID, the system is configured to: obtain asset metadata from the data bits for the finding; determine whether the asset metadata corresponds to an existing asset; in response to determining the asset metadata corresponds to the existing asset, retrieve the asset ID for the existing asset; and, in response to determining the asset metadata does not correspond to the existing asset, generate a new asset record and obtain a new asset ID as the asset ID.

Clause 25. The system of Clause 23, wherein, to determine the vulnerability ID for the finding, the system is configured to: obtain finding data from the data bits for the finding; and determine the vulnerability ID based on a type of scanner and the finding data.

Clause 26. The system of Clause 25, wherein, to determine the vulnerability ID based on the type of scanner and the finding data, the system is configured to: determine whether the finding data is a CVE based on the type of scanner; in response to determining the finding data is the CVE based on the type of scanner, set the vulnerability ID as the CVE from the finding data; and, in response to determining the finding data is not the CVE based on the type of scanner, use a lookup function based on the type of scanner and the finding data to retrieve the vulnerability ID.

Clause 27. The system of any of Clauses 21-26, wherein the system is configured to: store the plurality of trend records in a trend data structure; and perform vulnerability management actions using the at least one analytic data structure, the finding data structure, and/or the trend data structure.

Clause 28. The system of any of Clauses 21-27, wherein the system is configured to: determine key values for the plurality of findings, wherein a key value differentiates a vulnerability of a finding from other vulnerabilities on a same asset; and add the key values to respective sets of values for finding records.

Clause 29. The system of Clause 28, wherein a first key value is based on at least a vulnerability ID for a first finding and at least one additional data bit of the first finding.

Clause 30. The system of Clause 29, wherein the at least one additional data bit includes one or combinations of: a parameter of a web application, a port of a host, a portion of code, and/or a container build version.

Clause 31. The system of Clause 29, wherein, to determine the first key value, the system is configured to: hash the vulnerability ID and the at least one additional data bit to obtain a hash value.

Clause 32. The system of any of Clauses 21-31, wherein, to determine the at least one analytic record for the plurality of findings, the system is configured to: generate a scan key value to differentiate a scan event occurring for the scanner data; generate scan metrics; and perform one or combinations of: (1) in a first type of analytic record, associate the scan key value with at least a scan date in a first analytic data structure; (2) in a second type of analytic record, associate the scan key value and the scan metrics in a second analytic data structure; and/or (3) in a third type of analytic record, associate the scan key value, asset IDs, and vulnerability IDs in a third analytic data structure.

Clause 33. The system of any of Clauses 21-32, wherein, to determine the plurality of trend records based on the finding data structure and the at least one analytic data structure, the system is configured to: compare different scan events by comparing analytic records associated with different scan key values to determine the change in a vulnerability status from a first time period to a second time period.

Clause 34. The system of Clause 33, wherein the system is configured to: determine whether an analytic record of a newest scan key value matches an analytic record of a previous scan key value; and, in response to the analytic record of the newest scan key value not matching the analytic record of the previous scan key value, determine a trend status for a corresponding trend record of the newest scan as discovered.

Clause 35. The system of Clause 33, wherein the system is configured to: determine whether an analytic record of a newest scan key value matches an analytic record of a previous scan key value; and, in response to the analytic record of the newest scan key value matching the analytic record of the previous scan key value, determine the trend status for the corresponding trend record of the newest scan as active.

Clause 36. The system of Clause 33, wherein the system is configured to: determine whether an analytic record of a newest scan key value matches an analytic record of a previous scan key value; and in response to the analytic record of the previous scan key value not matching any analytic record of the newest scan key value, determine the trend status for the corresponding trend record of the newest scan as scan mitigated.

Clause 37. A computer-implemented method for vulnerability detection and management, comprising: obtaining scanner data from at least one scanner, wherein the scanner data includes a plurality of findings; extracting data bits for each finding from the scanner data; determining, for each finding, a set of values based on the extracted data bits; storing, for each finding, a finding record in a finding data structure, wherein a finding record includes a set of values for a finding; determining at least one analytic record for the plurality of findings; storing the at least one analytic record in at least one analytic data structure; determining a plurality of trend records based on the finding data structure and the at least one analytic data structure, wherein the plurality of trend records include an indication of a change in a vulnerability status from a first time period to a second time period; and causing the indication of the change in the vulnerability status from the first time period to the second time period to be displayed to a user.

Clause 38. The computer-implemented method of Clause 37, wherein extracting the data bits for each finding from the scanner data includes: determining a type of scanner; determining a scanner model based on the type of scanner; and extracting, for each finding, the data bits for the finding using the scanner model.

Clause 39. The computer-implemented method of Clauses 37 or 38, wherein determining, for each finding, the set of values, includes: normalizing the data bits for a finding into a defined format; determining an asset ID for an asset for the finding; determining a vulnerability ID for the finding; and setting at least the asset ID and the vulnerability ID as the set of values.

Clause 40. The computer-implemented method of Clause 39, wherein determining the asset ID includes: obtaining asset metadata from the data bits for the finding; determining whether the asset metadata corresponds to an existing asset; in response to determining the asset metadata corresponds to the existing asset, retrieving the asset ID for the existing asset; and, in response to determining the asset metadata does not correspond to the existing asset, generating a new asset record and obtain a new asset ID as the asset ID.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for vulnerability detection and management, the system comprising:

one or more user devices;

one or more organization information technology (IT) systems, each of the one or more organization IT systems having a plurality of assets;

a vulnerability management component in communication with the one or more user devices and the one or more organization IT systems, the vulnerability management component comprising:

at least one vulnerability scanner configured to scan the one or more organization IT systems for vulnerabilities;

at least one processor; and at least one memory in communication with the at least one processor and storing instructions executable by the at least one processor to:

obtain scanner data from the at least one vulnerability scanner, wherein the scanner data includes a plurality of findings;

extract data bits for each finding from the scanner data;

determine, for each finding of the plurality of findings, a set of values based on the extracted data bits;

store, in a finding data structure, a finding record for each finding of the plurality of findings, wherein each finding record includes the set of values for each finding of the plurality of findings;

determine at least one analytic record for the plurality of findings;

store the at least one analytic record in at least one analytic data structure;

determine a plurality of trend records based on the finding data structure and the at least one analytic data structure;

detect a vulnerability at a first asset of the plurality of assets based on the plurality of trend records including an indication of a change in a vulnerability status from a first time period to a second time period for the first asset;

generate an alert or report based on the detected vulnerability at the first asset;

transmit the alert or report for display at a user device of the one or more user devices; and disable the first asset or monitor the first asset for external actors based on the detected vulnerability at the first asset, wherein the finding data structure comprises an asset ID and an aspect-level key value that differentiates occurrences of a same vulnerability of the plurality of findings on different aspects of a same asset of the plurality of assets, wherein the at least one analytic data structure comprises a scan key value for each scan event, a scan date, and a source identifier, wherein the plurality of trend records is stored in a trend data structure comprising at least a trend date, the asset ID, a vulnerability ID or aspect-level key value, and a trend status field constrained to one of: discovered, active, scan-mitigated, manually-mitigated, or discovered-and-mitigated, and wherein the plurality of assets comprises network equipment, the one or more user devices, office equipment, servers, software, or a combination thereof.

2. The system of claim 1, wherein, to extract the data bits for each finding of the plurality of findings from the scanner data, the instructions are further executable by the at least one processor to:

determine a type of scanner;

determine a scanner model based on the type of scanner; and extract, for each finding of the plurality of findings, the data bits for each finding of the plurality of findings using the scanner model.

3. The system of claim 1, wherein, to determine, for each finding of the plurality of findings, the set of values, the instructions are further executable by the at least one processor to:

normalize the data bits for each finding of the plurality of findings into a defined format;

determine the asset ID for an asset for each finding of the plurality of findings;

determine the vulnerability ID for each finding of the plurality of findings; and set at least the asset ID and the vulnerability ID as the set of values.

4. The system of claim 3, wherein, to determine the asset ID, the instructions are further executable by the at least one processor to:

obtain asset metadata from the data bits for each finding of the plurality of findings;

determine whether the asset metadata corresponds to an existing asset;

in response to determining the asset metadata corresponds to the existing asset, retrieve the asset ID for the existing asset; and in response to determining the asset metadata does not correspond to the existing asset, generate a new asset record and obtain a new asset ID as the asset ID.

5. The system of claim 3, wherein, to determine the vulnerability ID for each finding, the instructions are further executable by the at least one processor to:

obtain finding data from the data bits for each finding of the plurality of findings; and determine the vulnerability ID based on a type of scanner and the finding data.

6. The system of claim 5, wherein, to determine the vulnerability ID based on the type of scanner and the finding data, the instructions are further executable by the at least one processor to:

determine whether the finding data is Common Vulnerabilities and Exposures (CVE) data based on the type of scanner; and in response to determining the finding data is the CVE data based on the type of scanner, set the vulnerability ID as a CVE ID from the finding data; or in response to determining the finding data is not the CVE data based on the type of scanner, use a lookup function based on the type of scanner and the finding data to retrieve the vulnerability ID.

7. The system of claim 1, wherein the instructions are further executable by the at least one processor to:

perform vulnerability management actions using at least one of: the at least one analytic data structure, the finding data structure, and the trend data structure.

8. The system of claim 1, wherein a first key value is based on at least the vulnerability ID for a first finding and at least one additional data bit of the first finding.

9. The system of claim 8, wherein the at least one additional data bit includes one or combinations of: a parameter of a web application, a port of a host, a portion of code, and a container build version.

10. The system of claim 8, wherein, to determine the first key value, the instructions are further executable by the at least one processor to:

hash the vulnerability ID and the at least one additional data bit to obtain a hash value.

11. The system of claim 1, wherein, to determine the at least one analytic record for the plurality of findings, the instructions are further executable by the at least one processor to:

generate respective scan key values to differentiate the scan events occurring for the scanner data;

generate scan metrics; and perform one or combinations of:

in a first type of analytic record, associate the respective scan key values with at least the scan date in a first analytic data structure;

in a second type of analytic record, associate the respective scan key values and the scan metrics in a second analytic data structure; and in a third type of analytic record, associate the respective scan key values, the asset IDs, and the vulnerability IDs in a third analytic data structure.

12. The system of claim 1, wherein, to determine the plurality of trend records based on the finding data structure and the at least one analytic data structure, the instructions are further executable by the at least one processor to:

compare different scan events by comparing analytic records associated with different scan key values to determine the change in the vulnerability status from the first time period to the second time period.

13. The system of claim 12, wherein the instructions are further executable by the at least one processor to:

determine whether an analytic record of a newest scan key value matches an analytic record of a previous scan key value; and in response to the analytic record of the newest scan key value not matching the analytic record of the previous scan key value, determine the trend status for a corresponding trend record discovered from a newest scan.

14. The system of claim 12, wherein the instructions are further executable by the at least one processor to:

determine whether an analytic record of a newest scan key value matches an analytic record of a previous scan key value; and in response to the analytic record of the newest scan key value matching the analytic record of the previous scan key value, determine the trend status for a corresponding trend record of a newest active scan.

15. The system of claim 12, wherein the instructions are further executable by the at least one processor to:

determine whether an analytic record of a newest scan key value matches an analytic record of a previous scan key value; and in response to the analytic record of the previous scan key value not matching any analytic record of the newest scan key value, determine the trend status for a corresponding trend record of a newest mitigated scan.

16. A computer-implemented method for vulnerability detection and management, comprising:

obtaining scanner data from at least one vulnerability scanner configured to scan one or more organization IT systems for vulnerabilities, each of the one or more organization IT systems having a plurality of assets, wherein the scanner data includes a plurality of findings;

extracting data bits for each finding of the plurality of findings from the scanner data;

determining, for each finding of the plurality of findings, a set of values based on the extracted data bits;

storing, in a finding data structure, a finding record for each finding of the plurality of findings, wherein each finding record includes the set of values for a finding;

determining at least one analytic record for the plurality of findings;

storing the at least one analytic record in at least one analytic data structure;

determining a plurality of trend records based on the finding data structure and the at least one analytic data structure;

detecting a vulnerability at a first asset of the plurality of assets based on the plurality of trend records including an indication of a change in a vulnerability status from a first time period to a second time period for the first asset;

generating an alert or report based on the detected vulnerability at the first asset;

transmitting the alert or report for display at a user device of one or more user devices; and disabling the first asset or monitoring the first asset for external actors based on the detected vulnerability at the first asset, wherein the finding data structure comprises an asset ID and an aspect-level key value that differentiates occurrences of a same vulnerability of the plurality of findings on different aspects of a same asset of the plurality of assets, wherein the at least one analytic data structure comprises a scan key value for each scan event, a scan date, and a source identifier, wherein the plurality of trend records is stored in a trend data structure comprising at least a trend date, the asset ID, a vulnerability ID or aspect-level key value, and a trend status field constrained to one of: discovered, active, scan-mitigated, manually-mitigated, or discovered-and-mitigated, and wherein the plurality of assets comprises network equipment, the one or more user devices, office equipment, servers, software, or a combination thereof.

17. The computer-implemented method of claim 16, wherein extracting the data bits for each finding of the plurality of findings from the scanner data includes:

determining a type of scanner;

determining a scanner model based on the type of scanner; and extracting, for each finding of the plurality of findings, the data bits for each finding using the scanner model.

18. The computer-implemented method of claim 16, wherein determining, for each finding of the plurality of findings, the set of values includes:

normalizing the data bits for a finding into a defined format;

determining the asset ID for an asset for each finding of the plurality of findings;

determining the vulnerability ID for each finding of the plurality of findings; and setting at least the asset ID and the vulnerability ID as the set of values.

19. The computer-implemented method of claim 18, wherein determining the asset ID includes:

obtaining asset metadata from the data bits for each finding of the plurality of findings;

determining whether the asset metadata corresponds to an existing asset;

in response to determining the asset metadata corresponds to the existing asset, retrieving the asset ID for the existing asset; and in response to determining the asset metadata does not correspond to the existing asset, generating a new asset record and obtaining a new asset ID as the asset ID.

* * * * *